US012675139B2

(12) United States Patent
Meen et al.

(10) Patent No.: US 12,675,139 B2
(45) Date of Patent: Jul. 7, 2026

(54) ELECTRONIC DEVICE PROVIDING STATUS INFORMATION BY CHANGING SHAPE OF ELECTRONIC DEVICE, AND METHOD FOR CONTROLLING THE SAME

(71) Applicant: SAMSUNG ELECTRONICS CO., LTD., Suwon-si (KR)

(72) Inventors: Youngjae Meen, Suwon-si (KR); Sungman Kim, Suwon-si (KR); Yeojin Kim, Suwon-si (KR); Eunsun Kim, Suwon-si (KR); Leebin Kim, Suwon-si (KR); Kuenyoung Seo, Suwon-si (KR); Hyunjin Shin, Suwon-si (KR); Jihyun Ahn, Suwon-si (KR); Hwajung Riu, Suwon-si (KR); Dasom Lee, Suwon-si (KR); Boram Lee, Suwon-si (KR); Jeonghyun Lee, Suwon-si (KR); Sunghyo Jeong, Suwon-si (KR); Inji Jin, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 568 days.

(21) Appl. No.: 18/303,521

(22) Filed: Apr. 19, 2023

(65) Prior Publication Data

US 2023/0333605 A1     Oct. 19, 2023

Related U.S. Application Data

(63) Continuation of application No. PCT/KR2023/005324, filed on Apr. 19, 2023.

(30) Foreign Application Priority Data

Apr. 19, 2022    (KR) ........................ 10-2022-0048544
Jun. 28, 2022    (KR) ........................ 10-2022-0078991

(51) Int. Cl.
*G06F 1/16*          (2006.01)
*H04M 1/02*        (2006.01)

(52) U.S. Cl.
CPC .......... *G06F 1/1677* (2013.01); *G06F 1/1624* (2013.01); *G06F 1/1652* (2013.01); *H04M 1/0268* (2013.01)

(58) Field of Classification Search
CPC .... G06F 1/1677; G06F 1/1624; G06F 1/1652; G06F 3/0481; H04M 1/0268; H04M 1/0241; H04M 1/0235
See application file for complete search history.

(56) References Cited

U.S. PATENT DOCUMENTS 12,445,544 B2 * 10/2025 Yen ...................... H04M 1/0268
2004/0259609 A1 * 12/2004 Fujii ................... H04M 1/0225
                                                                    455/575.3

(Continued)

FOREIGN PATENT DOCUMENTS

CN          112083820 A      12/2020
CN          112333333 A       2/2021

(Continued)

OTHER PUBLICATIONS

International Search Report mailed Jul. 31, 2023 for PCT/KR2023/005324.

*Primary Examiner* — Lewis G West
(74) *Attorney, Agent, or Firm* — CANTOR COLBURN LLP

(57)          ABSTRACT

An electronic device identifies an occurrence of an event related to the electronic device, identifies whether a state of the electronic device is a first state based on the identified occurrence of the event, when the state of the electronic device is the first state, controls the driving module so that the flexible display moves in the second direction, and (Continued)

displays information related to the occurring event on the flexible display extended according to control of the driving module.

20 Claims, 24 Drawing Sheets

(56)                    References Cited

U.S. PATENT DOCUMENTS

| | | | |
|---|---|---|---|
| 2013/0300682 A1 | 11/2013 | Choi et al. | |
| 2016/0112667 A1* | 4/2016 | Park | G06F 3/0346 |
| | | | 348/739 |
| 2016/0306534 A1* | 10/2016 | Woo | G06F 3/04847 |
| 2019/0197960 A1 | 6/2019 | Kim | |
| 2019/0278465 A1* | 9/2019 | Zhou | G06F 1/3265 |
| 2019/0287704 A1* | 9/2019 | Lin | G01R 31/3646 |
| 2021/0044683 A1* | 2/2021 | He | G06F 1/1652 |
| 2021/0072796 A1 | 3/2021 | Kim et al. | |
| 2021/0089173 A1* | 3/2021 | Han | G06F 3/0488 |
| 2021/0208697 A1 | 7/2021 | Zhu | |
| 2022/0214723 A1 | 7/2022 | Hu | |
| 2022/0261093 A1 | 8/2022 | Zhang et al. | |
| 2022/0329687 A1* | 10/2022 | Kim | H04M 1/0268 |
| 2023/0316453 A1* | 10/2023 | Kim | G06F 1/1624 |
| | | | 382/298 |
| 2024/0098173 A1* | 3/2024 | Wu | H04M 1/72409 |

FOREIGN PATENT DOCUMENTS

| | | | |
|---|---|---|---|
| CN | 113010065 A | 6/2021 | |
| CN | 113422872 A | 9/2021 | |
| KR | 20140144029 A | 12/2014 | |
| KR | 1020190079241 A | 7/2019 | |
| KR | 20200075809 A | 6/2020 | |
| KR | 20210151675 A | 12/2021 | |
| KR | 20220045177 A | 4/2022 | |
| KR | 20220045970 A | 4/2022 | |

* cited by examiner

Start

Identify occurrence of event related to electronic device ~210b

Control driving module to move flexible display in second direction based on identification of occurrence of event ~220b Display information related to occurring event on flexible display extended according to control of driving module ~230b End

ELECTRONIC DEVICE PROVIDING STATUS INFORMATION BY CHANGING SHAPE OF ELECTRONIC DEVICE, AND METHOD FOR CONTROLLING THE SAME

CROSS-REFERENCE TO RELATED APPLICATIONS

This application is a PCT-Bypass Continuation application, claiming priority under § 365(c), of an International application No. PCT/KR2023/005324, filed on Apr. 19, 2023, which is based on and claims the benefit of Korean patent application Nos. 10-2022-0048544 and 10-2022-0078991, filed on Apr. 19, 2022, and Jun. 28, 2022, respectively, in the Korean Intellectual Property Office, the disclosure of which are incorporated by reference herein their entirety.

BACKGROUND

1. Field

The disclosure relates to an electronic device providing status information by changing the shape of the electronic device and a method for controlling the same.

2. Description of Related Art

More and more services and additional functions are being provided through electronic devices, e.g., smartphones, or other portable electronic devices. To meet desires of various users and to raise use efficiency of electronic devices, communication service carriers or device manufacturers are jumping into competitions to develop electronic devices with differentiated and diversified functionalities. Accordingly, various functions that are provided through electronic devices are evolving more and more.

For conventional bar-type electronic devices (e.g., smartphones), status information (e.g., battery charging status information) about the electronic device (e.g., smartphone) is identified by activating the electronic device and then checking on the display or the display of an external electronic device (e.g., smart watch) operated in remote connection with the electronic device. However, a desire arises for developing technology capable of identifying status information about an electronic device in a brand-new manner for electronic devices that are transformable as the flexible display is drawn in or out.

In an embodiment of the disclosure, there may be provided an electronic device allowing the user to intuitively recognize the status information about the electronic device through transformation of the electronic device.

In an embodiment of the disclosure, there may be provided an electronic device capable of controlling an accessory device of the electronic device or an external electronic device operably connected with the accessory device according to the status of the electronic device by physically manipulating the accessory device through transformation of the electronic device.

SUMMARY

An electronic device in an embodiment of the disclosure may include a first housing, a second housing disposed to be movable with respect to the first housing and overlapping at least a portion of the first housing, at least one processor and a driving module disposed in the second housing, and a flexible display at least partially disposed (e.g., mounted) on a surface of the second housing and at least partially exposed to an outside of the electronic device. At least a portion of the flexible display is inserted into an inside of the first housing based on a movement of the second housing with respect to the first housing in a first direction and drawn out from the inside of the first housing based on a movement of the second housing with respect to the first housing in a second direction. The at least one processor may be configured to identify an occurrence of an event related to the electronic device, identify whether a state of the electronic device is a first state based on the identified occurrence of the event, when the state of the electronic device is the first state, control the driving module so that the flexible display moves in the second direction, and display information related to the occurring event on the flexible display extended according to control of the driving module.

A method for controlling an electronic device in an embodiment of the disclosure may include identifying an occurrence of an event related to the electronic device, identifying whether a state of the electronic device is a first state based on the identified occurrence of the event, when the state of the electronic device is the first state, controlling the driving module so that the flexible display moves in the second direction, and displaying information related to the occurring event on the flexible display extended according to control of the driving module.

In an embodiment of the disclosure, there may be provided an electronic device allowing the user to intuitively recognize the status information about the electronic device through transformation of the electronic device.

In an embodiment of the disclosure, there may be provided an electronic device capable of controlling an accessory device of the electronic device or an external electronic device operably connected with the accessory device according to the status of the electronic device by physically manipulating the accessory device through transformation of the electronic device.

The effects set forth herein are not limited thereto, and it is apparent to one of ordinary skill in the art that various effects may be disclosed herein.

DETAILED DESCRIPTION

Figure 1A:
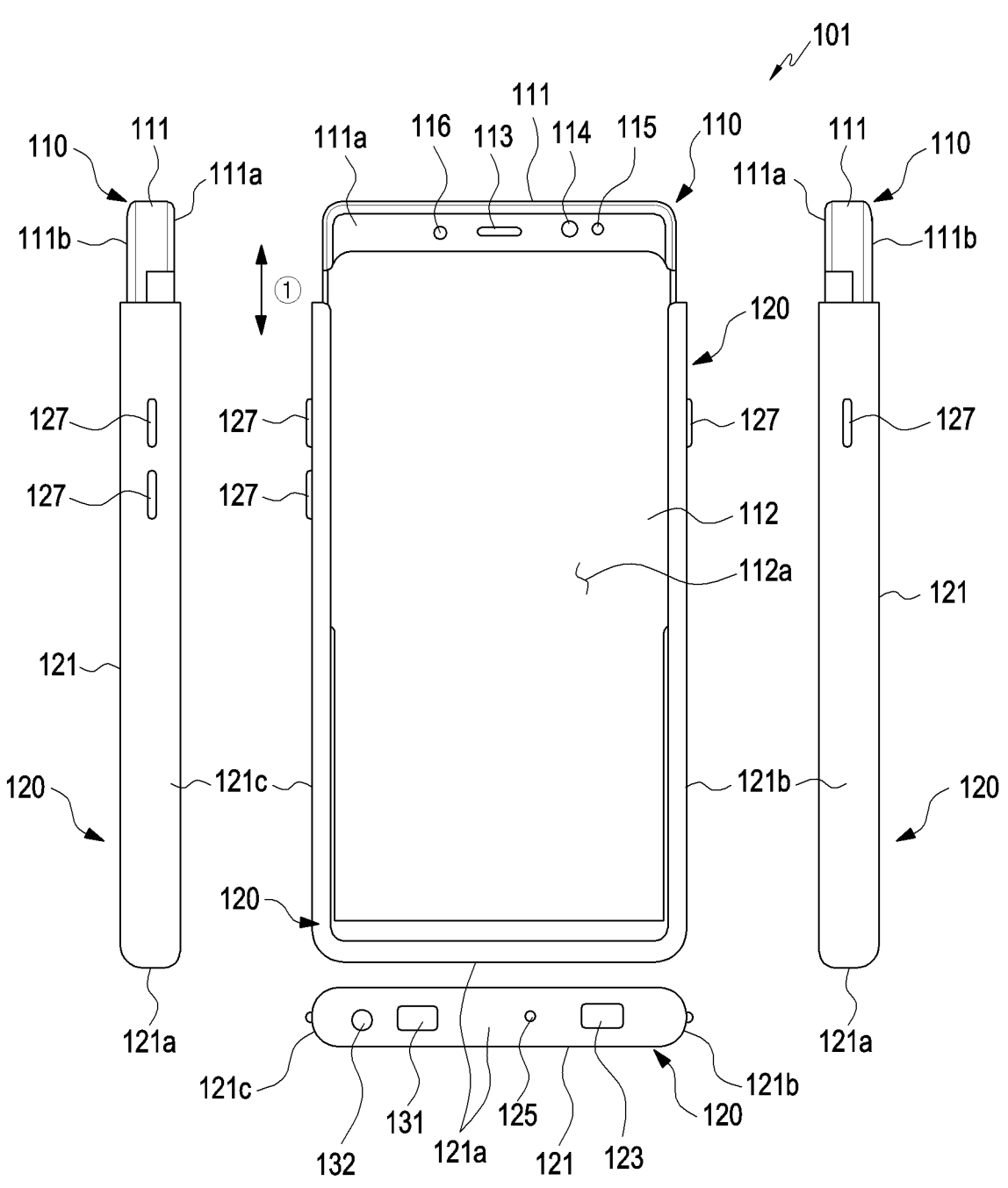
FIG. 1A is a view illustrating embodiments of a closed state of an electronic device according to the disclosure.
Figure 1B:
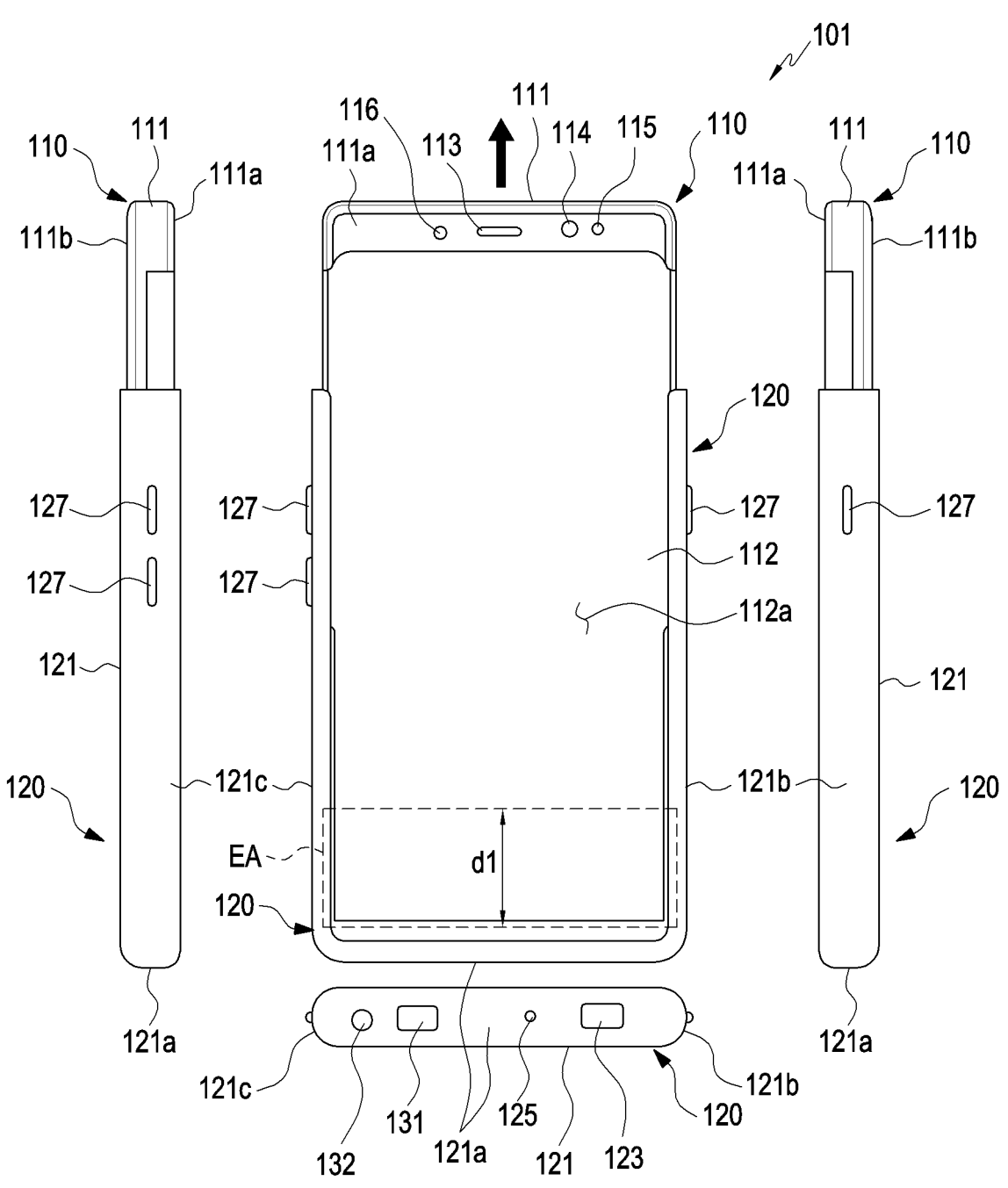
FIG. 1B is a view illustrating an opened state of the electronic device of FIG. 1A.
Figure 1C:
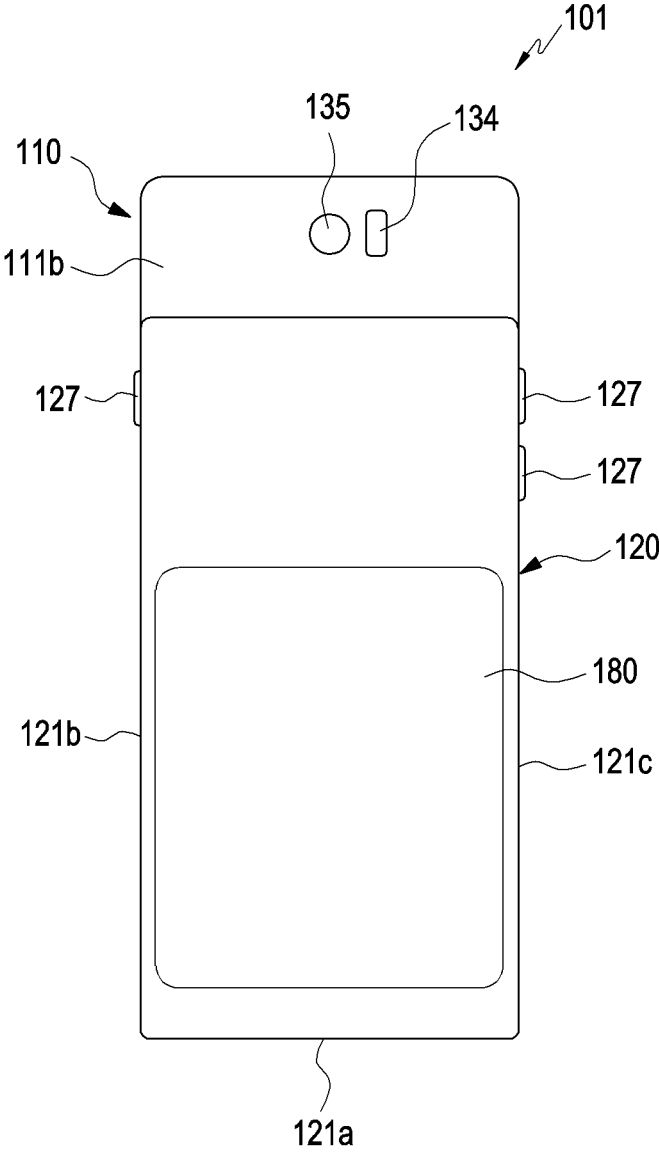
FIG. 1C is a view illustrating a rear surface of the electronic device of FIG. 1A.

FIG. 1A is a view illustrating embodiments of a closed state of an electronic device 101 (e.g., the electronic device 1601 shown in FIG. 16) according to the disclosure. FIG. 1B is a view illustrating an opened state of the electronic device 101 of FIG. 1A. FIG. 1C is a view illustrating a rear surface of the electronic device 101 of FIG. 1A.

FIG. 1A illustrates a closed state of a first structure 110 with respect to a second structure 120, and FIG. 1B illustrates an opened state of the first structure 110 with respect to the second structure 120.

Referring to FIGS. 1A, 1B, and 1C, an electronic device 101 may include a first structure 110 (e.g., first housing) and a second structure 120 (e.g., second housing) disposed to be movable from the first structure 110. In an embodiment of the disclosure, the first structure 110 may move back and forth by a predetermined distance dl along directions shown on the second structure 120. In an embodiment of the disclosure, a main circuit board on which electrical components, such as an application processor (AP) and a communication processor (CP) are disposed (e.g., mounted) may be disposed in the second housing 120. In an embodiment of the disclosure, a driving module (e.g., motor), a speaker, a sim socket, and/or a sub circuit board electrically connected with a main circuit board may be disposed in the second structure 120. In an embodiment of the disclosure, the rack may be disposed in the second structure 120 and guide the slide of the first structure 110 and the display (e.g., display panel) 112. In an embodiment of the disclosure, the rack may be fixedly disposed on one surface of the second structure 120 and guide a gear connected to the driving module to move in the sliding direction while rotating. In another embodiment of the disclosure, the rack may be disposed in the first structure 110, and the driving module may be disposed in the second structure 120. In an embodiment of the disclosure, a first plate 111 of the first structure 110 may include a first surface 111$a$ and a second surface 111$b$ facing in the direction opposite to the first surface 111$a$. In an embodiment of the disclosure, the second structure 120 may include a second plate 121, a first sidewall 121$a$ extending from the second plate 121, a second sidewall 121$b$ extending from the first sidewall 121$a$ and the second plate 121, a third sidewall 121$c$ extending from the first sidewall 121$a$ and the second plate 121 and in parallel to the second sidewall 121$b$, or a second rear plate 180 (e.g., rear window). In an embodiment, the second plate 121, the first sidewall 121$a$, the second sidewall 121$b$, and the third sidewall 121$c$ may form a trough 220$a$ to have an open side to receive at least a portion of the first structure 110. In an embodiment, the second structure 120 may be coupled to surround a portion of the first structure 110. The first structure 110 may reciprocate linearly along the direction of the arrow ①with respect to the second structure 120. In an embodiment of the disclosure, the second sidewall 121$b$ or the third sidewall 121$c$ may be omitted. In an embodiment of the disclosure, the second plate 121, the first sidewall 121$a$, the second sidewall 121$b$, or the third sidewall 121$c$ may be unitary with each other. In an embodiment of the disclosure, the second plate 121, the first sidewall 121$a$, the second sidewall 121$b$, or the third sidewall 121$c$ may be formed individually and be jointed together. In an embodiment, the second rear plate 180 may cover at least part of the display 112. In an embodiment of the disclosure, the size of the display screen displayed on the front surface may be changed by raising and lowering the second rear plate 180 in the vertical direction. In an embodiment of the disclosure, the first structure 110 is movable into the opened state and closed state with respect to the second structure 120, in the first direction (e.g., the direction of arrow ①) parallel to the second plate 121 and the second sidewall 121$b$ so that the first structure 110 is placed in a first distance from the first sidewall 121$a$ in the closed state and is placed in a second distance larger than the first distance, from the first sidewall 121$a$ in the opened state. In an embodiment of the disclosure, the electronic device 101 may include at least one or more of a display 112, audio modules 113 and 123, camera modules 115 and 135, an indicator 116 (e.g., a light-emitting diode (LED) device), sensor modules 114 and 134, a key input device 127, or connector holes 131 and 132. In an embodiment of the disclosure, the display 112 may include a flat portion 112a crossing and extending at least a portion of the first surface 111a and disposed on the first surface 111a and a bendable portion extending from the flat portion 112a to a space between the first sidewall 121a and the first structure 110 in the closed state. In an embodiment of the disclosure, as viewed from above the first plate 111, the bendable portion may at least partially be moved by a predetermined marked area EA to the flat portion 112a to form substantially a flat surface between the flat portion 112a and the first sidewall 121a when the first structure 110 is moved from the closed state to the open state. The display 112 may be coupled with, or adjacent, a touch detecting circuit, a pressure sensor capable of measuring the strength (pressure) of touches, and/or a digitizer for detecting a magnetic field-type stylus pen. In an embodiment, the display 112 may include a flexible touchscreen display layer, for example.

In an embodiment of the disclosure, the audio modules 113, 123, and 125 may include speaker holes 113 and 123 and a microphone hole 125. The speaker holes 113 and 123 may include a receiver hole 113 or an external speaker hole 123. A microphone may be disposed inside the microphone hole 125 to obtain external sounds. In an embodiment, there may be a plurality of microphones to be able to detect the direction of a sound. In an embodiment, the speaker holes 113 and 123 and the microphone hole 125 may be implemented as a single hole, or speakers (e.g., piezo electric speakers) may be included without the speaker holes 113 and 123. In an embodiment, the receiver hole 113 may be disposed in the first structure 110, and the external speaker hole 123 or the microphone hole 125 may be disposed in the second structure 120. In an embodiment, the external speaker hole 123 may be disposed on the second surface 111b of the first plate 111 or on a side surface of the first structure 110. In an embodiment, the microphone hole 125 may be disposed on a side surface of the first structure 110.

In an embodiment of the disclosure, the sensor modules 114 and 134 may generate an electrical signal or data value corresponding to an internal operating state or external environmental state of the electronic device 101. The sensor modules 114 and 134 may include a first sensor module 114 (e.g., a proximity sensor) disposed on, e.g., the first surface 111a of the first plate 111 and/or a second sensor module (e.g., a fingerprint sensor) (not shown) disposed on the second surface 111b of the first plate 111 and/or a third sensor module 134 (e.g., a hear rate monitor (HRM) sensor). The electronic device 101 may include a sensor module not shown, e.g., at least one of a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor. In various embodiments of the disclosure, the electronic device 101 may include various sensors (e.g., a hall sensor and/or an optical sensor) for determining the draw-out length of the display 112. In various embodiments of the disclosure, a scheme using a hall sensor or a magnetic sensor may be a scheme for measuring the absolute coordinate value for displacement of the display 112 by measuring a change in magnetic force of a moving magnetic substance. In various embodiments of the disclosure, an inductive scheme may be a scheme for determining the draw-out length of the display 112 by detecting a change in magnetic field. Other various techniques for determining the draw-out length of the display 112 may be applied to various embodiments of the disclosure.

In an embodiment of the disclosure, the camera modules 115 and 135 include a first camera device 115 disposed on the first surface 111a of the first plate 111 and a second camera device 135 disposed on the second surface 111b. The first camera device 115 or the second camera device 135 may include one or more lenses, an image sensor, and/or an image signal processor. In an embodiment, the second camera device 135 may be disposed on one surface of the second structure 120.

In an embodiment of the disclosure, the key input device 127 may be disposed on the second sidewall 121b or the third sidewall 121c of the second structure 120. The electronic device 101 may include a key input device (not shown), e.g., a home key button or a touchpad disposed around the home key button. In an embodiment, at least a portion of the key input device 127 may be disposed on an area of the first structure 110. In an embodiment of the disclosure, the key input device 127 may include a physical button and/or a touch button for drawing out or in the display 112. In an embodiment of the disclosure, the display 112 may be fully drawn out or in the electronic device 101 according to the user's input to the key input device 127. Alternatively, according to an embodiment of the disclosure, only a predesignated portion of the display 112 may be drawn out or in the electronic device 101 according to the user's input to the key input device 127. In an embodiment of the disclosure, when the user's input to the key input device 127 is detected, the electronic device 101 (e.g., processor) may drive the driving module (e.g., motor) for drawing out or in the display 112. In an embodiment of the disclosure, in the electronic device 101, it is possible to fully/partially draw the display 112 out or in the electronic device 101 even manually (e.g., the user's external force for drawing the display 112 out or in the electronic device 101).

In an embodiment of the disclosure, the indicator (also referred to as light-emitting module) 116 may be disposed on the first surface 111a of the first plate 111. The light-emitting module 116 may provide, e.g., state information about the electronic device 101 in the form of light and may include an LED.

In an embodiment of the disclosure, the connector holes 131 and 132 may include, e.g., a first connector hole 131 for receiving a connector (e.g., a universal serial bus (USB) connector) for transmitting or receiving power and/or data to/from an external electronic device and/or a second connector hole (e.g., an earphone jack) 132 for receiving a connector for transmitting or receiving audio signals to/from the external electronic device. In an embodiment, the first connector hole 131 or the second connector hole 132 may be disposed on the first sidewall 121a of the second structure 120. In an embodiment, the first connector hole 131 or the second connector hole 132 may be formed on a side wall of the first structure 110.

Figure 2:
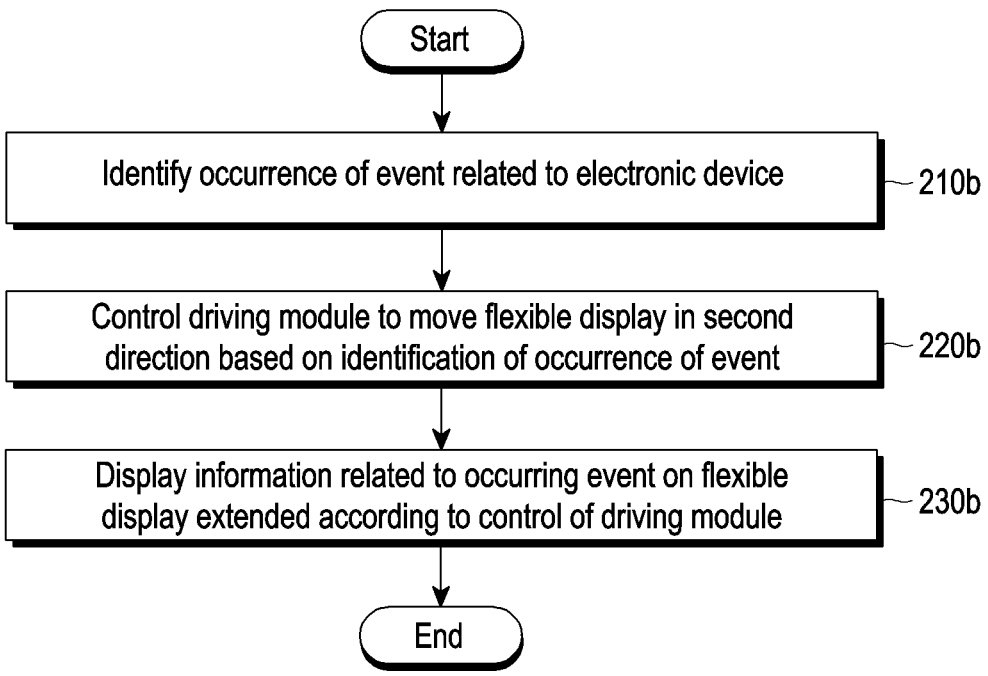
FIG. 2 is a view illustrating an embodiment of a function or operation of intuitively providing status information by transforming an electronic device according to the disclosure.

FIG. 2 is a view illustrating a function or operation of intuitively providing status information by transforming an electronic device 101 according to the disclosure.

Referring to FIG. 2, the electronic device 101 in an embodiment of the disclosure may identify an occurrence of an event related to the electronic device 101 in operation 210b. In an embodiment of the disclosure, the event may include at least one of a charging event for charging the battery, an alarm generation event, a text message reception event, an event of executing a payment application, an emergency event, an event of a change in biometric information, an event of a change in the context of performing a task, or an event of a change in return rate. The electronic device 101 in an embodiment of the disclosure may identify whether the state of the electronic device 101 is a first state based on the identified occurrence of the event. In an embodiment of the disclosure, the first state may include a standby state or a lock state.

In an embodiment of the disclosure, in operation 220b, the electronic device 101 may control the driving module to move the flexible display in a specific direction (e.g., second direction) based on the identification of the occurring event. In an embodiment, when the occurring event is an event of charging the battery of the electronic device 101, the electronic device 101 may draw out the flexible display to correspond to the charging state of the battery. Accordingly, the electronic device 101 may be transformed. In an embodiment of the disclosure, before performing operation 220b, the electronic device 101 may further perform the operation of determining the current drawn-out and/or drawn-in (slide-in, rolled, shrink) state of the flexible display (e.g., the display 112). In this case, the electronic device 101 in an embodiment of the disclosure may change its shape (e.g., by drawing the flexible display out or in the housing) only when it is needed to draw out and/or in the flexible display based on the current drawn-out and/or drawn-in state of the flexible display (e.g., the display 112). In an embodiment, when the flexible display is drawn out in an intermediate state (e.g., a 50% drawn-out state with respect to the fully drawn-out state), when the identified battery charge is identified as substantially 50%, the electronic device 101 according to an embodiment of the disclosure may not extend the flexible display in the second direction.

In an embodiment of the disclosure, in operation 230b, the electronic device 101 may display information related to the occurring event on the extended flexible display according to control of the driving module. In an embodiment, when the occurring event is an event of charging the battery of the electronic device 101, the electronic device 101 may display information about the charging state on the flexible display while drawing out the flexible display to correspond to the battery charging status.

The electronic device 101 in an embodiment of the disclosure may determine whether the occurring event is a primary event designated by the user. In an embodiment of the disclosure, when the occurring event is a primary event designated by the user, the electronic device 101 may perform operations 220b and 230b. In other words, when the occurring event is the primary event designated by the user, the electronic device 101 in an embodiment of the disclosure may draw out or in the flexible display or may display information about the occurring event while drawing out or in the flexible display.

Figures 3A, 3B, 3C:
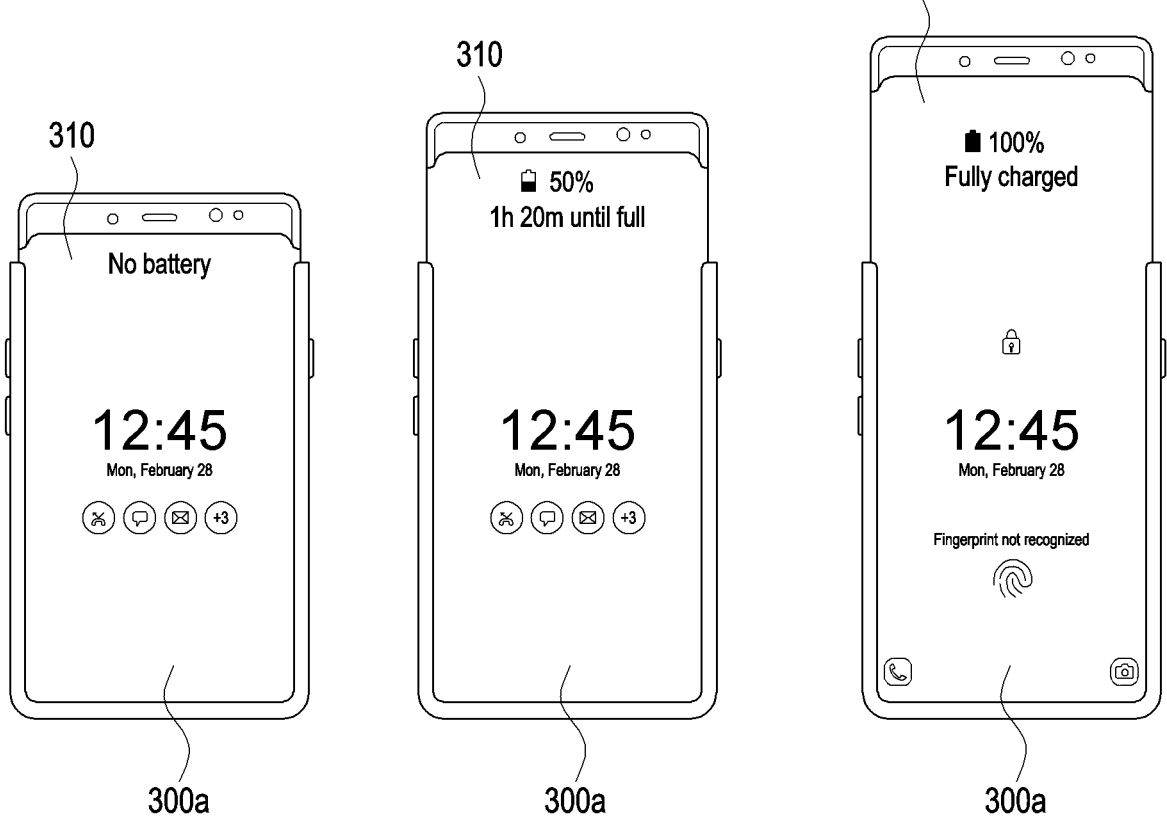
FIGS. 3A to 3C are views illustrating an embodiment of a function or operation of transforming an electronic device depending on a charging status of a battery when an event is an event for charging the battery of the electronic device according to the disclosure.

FIGS. 3A to 3C are views illustrating a function or operation of transforming an electronic device 101 depending on a charging status of a battery when an event is an event for charging the battery of the electronic device 101 according to the disclosure.

Referring to FIG. 3A, the electronic device 101 in an embodiment of the disclosure may identify that the battery level is substantially 0% (e.g., a level between 0% and 1%) in the fully closed state of the electronic device 101. The electronic device 101 in an embodiment of the disclosure may display information (e.g., "No battery") indicating that the battery level is substantially 0% on the always on display (AOD) screen 300a. The electronic device 101 according to an embodiment of the disclosure may display information (e.g., "No battery") in a pop-up window on the always on display (AOD) screen 300a. The AOD is a function of displaying specific information (or a notification) on a display of the electronic device in a standby state so that a user can easily recognize various events (e.g., call occurrence, reception of a text message, low battery charge, and the like) occurring in the electronic device while the user is not using the electronic device (e.g., the standby state). Referring to FIG. 3B, according to the disclosure, upon identifying that the battery level is 50%, the electronic device 101 may change the state of the electronic device 101 from the fully closed state to a partially closed state. In an embodiment of the disclosure, the state change of the electronic device 101 may be continuously/gradually performed depending on the charging state (e.g., battery level) of the battery. The electronic device 101 in an embodiment of the disclosure may draw out the flexible display using a lookup table defining the relationship between battery level and draw-out length (e.g., a length of the extended portion of the flexible display according to slide-out (expanded, unrolled) operation). In an alternative embodiment, the electronic device 101 in an embodiment of the disclosure may draw out the flexible display using a lookup table defining the relationship between battery level and draw-out ratio. The electronic device 101 in an embodiment of the disclosure may determine the current draw-out state (e.g., draw-out length) of the flexible display to determine the draw-out length or the draw-out ratio with respect to the current draw-out state. In an embodiment, the electronic device 101 in an embodiment of the disclosure may draw out the flexible display by 0.2 centimeter (cm) every 1% increment of the battery level by referring to the lookup table. In an embodiment, the electronic device 101 may draw out the flexible display by 0.5% of the current draw-out length, every 1% increment of the battery level by referring to the lookup table. Referring to FIG. 3C, according to the disclosure, upon identifying that the battery level is 100%, the electronic device 101 may control the driving module so that the state of the electronic device 101 becomes the fully opened state. FIGS. 3A to 3C illustrate an embodiment in which the electronic device 101 switches from the fully closed state to the fully opened state for convenience of description. However, various embodiments of the disclosure may also apply even where the electronic device 101 switches from a partially closed state to the fully opened state. The electronic device 101 according to an embodiment may determine a state of the flexible display (e.g., a current state of the electronic device 101). The electronic device 101 according to an embodiment may determine a look-up table suitable for the current state of the electronic device 101, and control a driving module to drawn-in or drawn-out the flexible display based on information included in the determined look-up table. In other words, the electronic device 101 may determine the length of the flexible display to be drawn-in or drawn-out from the current state of the electronic device 101. The electronic device 101 may display information related to progress of the event on the opened or closed flexible display according to the determined length. The electronic device 101 according to an embodiment of the disclosure may switch from the opened state to the closed state when a specified time period is expires from a time point at which the battery is fully charged.

Figures 4A, 4B, 4C:
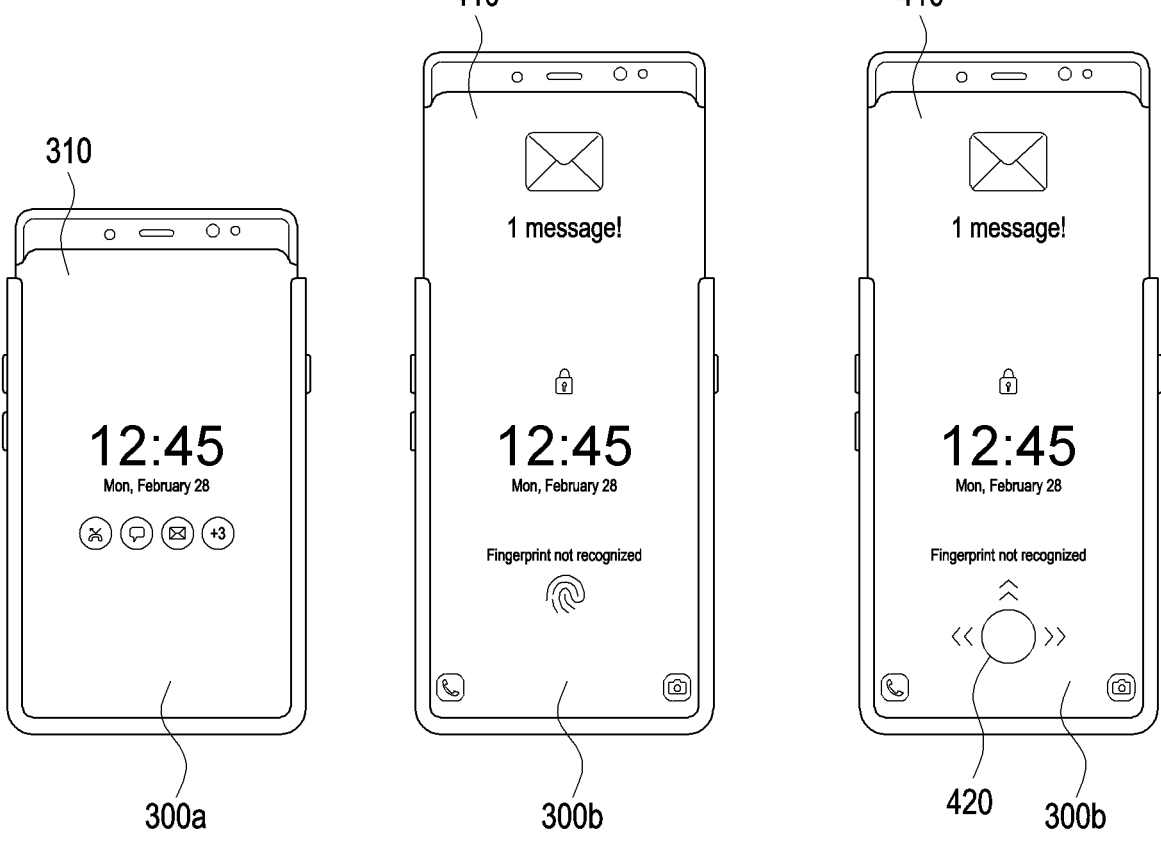
FIGS. 4A to 4C are views illustrating an embodiment of a function or operation of transforming an electronic device according to reception of a message when an event is a message reception event according to the disclosure.

FIGS. 4A to 4C are views illustrating a function or operation of transforming an electronic device according to reception of a message when an event is a message reception event according to the disclosure.

Referring to FIG. 4A, the electronic device 101 in an embodiment of the disclosure may display an AOD screen 300a in the fully closed state of the electronic device 101. Referring to FIG. 4B, according to the disclosure, upon identifying reception of a message, the electronic device 101 may change the electronic device 101 into the fully opened state. In this case, information (e.g., "1 message") indicating that a text message is received may be displayed on the extended flexible display. The electronic device 101 in an embodiment of the disclosure may display information (e.g., "1 message") indicating that a text message is received on the lock screen 300*b*. Referring to FIG. 4C, the electronic device 101 in an embodiment of the disclosure may display a visual object 420 for controlling the electronic device 101 on the lock screen 300*b*. The electronic device 101 in an embodiment of the disclosure may control the electronic device 101 according to the user's input to the visual object 420. In an embodiment, when the visual object 420 is moved to the left by the user, the electronic device 101 may switch the state of the electronic device 101 into the fully closed state. In an embodiment of the disclosure, even when switched into the fully closed state, the electronic device 101 may maintain the display of the lock screen 300*b*. Further, when the visual object 420 is moved to the right by the user, the locked state may be released. In this case, the electronic device 101 in an embodiment of the disclosure may change its state into a predesignated size or the state in which the locked state was last released (e.g., partially closed state). Further, when the visual object 420 is moved up by the user, the electronic device 101 may execute an application (e.g., message application) related to the occurring event. In this case, the electronic device 101 in an embodiment of the disclosure may display the execution screen of the application (e.g., message application) while maintaining the size of the fully opened state.

Figure 5:
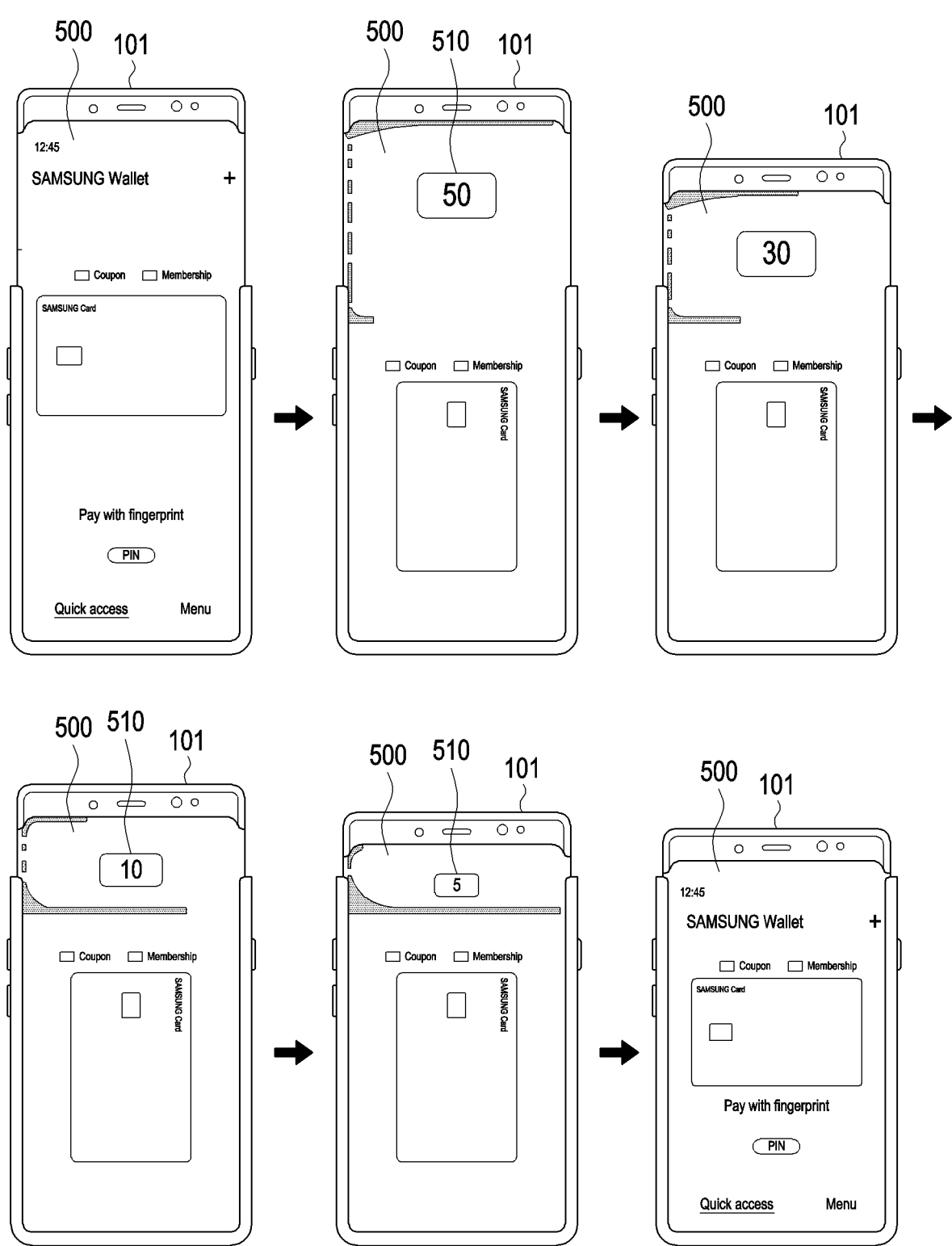
FIG. 5 is a view illustrating an embodiment of a function or operation of transforming an electronic device over time when an event is an event of execution of a payment application according to the disclosure.

FIG. 5 is a view illustrating an embodiment of a function or operation of transforming an electronic device over time when an event is an event of execution of a payment application according to the disclosure.

Referring to FIG. 5, in an embodiment according to the disclosure, when a specified application (e.g., Samsung® Pay™ as a payment application) is executed, the electronic device 101 may control the driving module so that the state of the electronic device 101 becomes the fully opened state. The electronic device 101 in an embodiment of the disclosure may control the driving module so that the state of the electronic device 101 gradually becomes the closed state over time. The electronic device 101 in an embodiment of the disclosure may determine the current draw-out state (e.g., draw-out length) of the flexible display to determine the draw-out length or the draw-out ratio with respect to the current draw-out state. In an embodiment, the electronic device 101 according to an embodiment of the disclosure may draw in the flexible display by 0.2 cm every 1-second decrement of the time by referring to the lookup table. In another embodiment, the electronic device 101 according to an embodiment of the disclosure may draw in the flexible display by 1% of the current draw-out length from the current draw-out length, every 1-second decrement of the time by referring to the lookup table. FIG. 5 illustrates an embodiment in which the electronic device 101 switches from the fully opened state to the fully closed state for convenience of description. However, according to various embodiments of the disclosure is not limited thereto, and various embodiments of the disclosure may also apply even where the electronic device 101 switches from a partially opened state to the fully closed state. In an embodiment of the disclosure, as shown in FIG. 5, a visual effect 510 that at least one of the position or shape is changed over time may be displayed around an edge 500 of the flexible display.

Figure 6A:
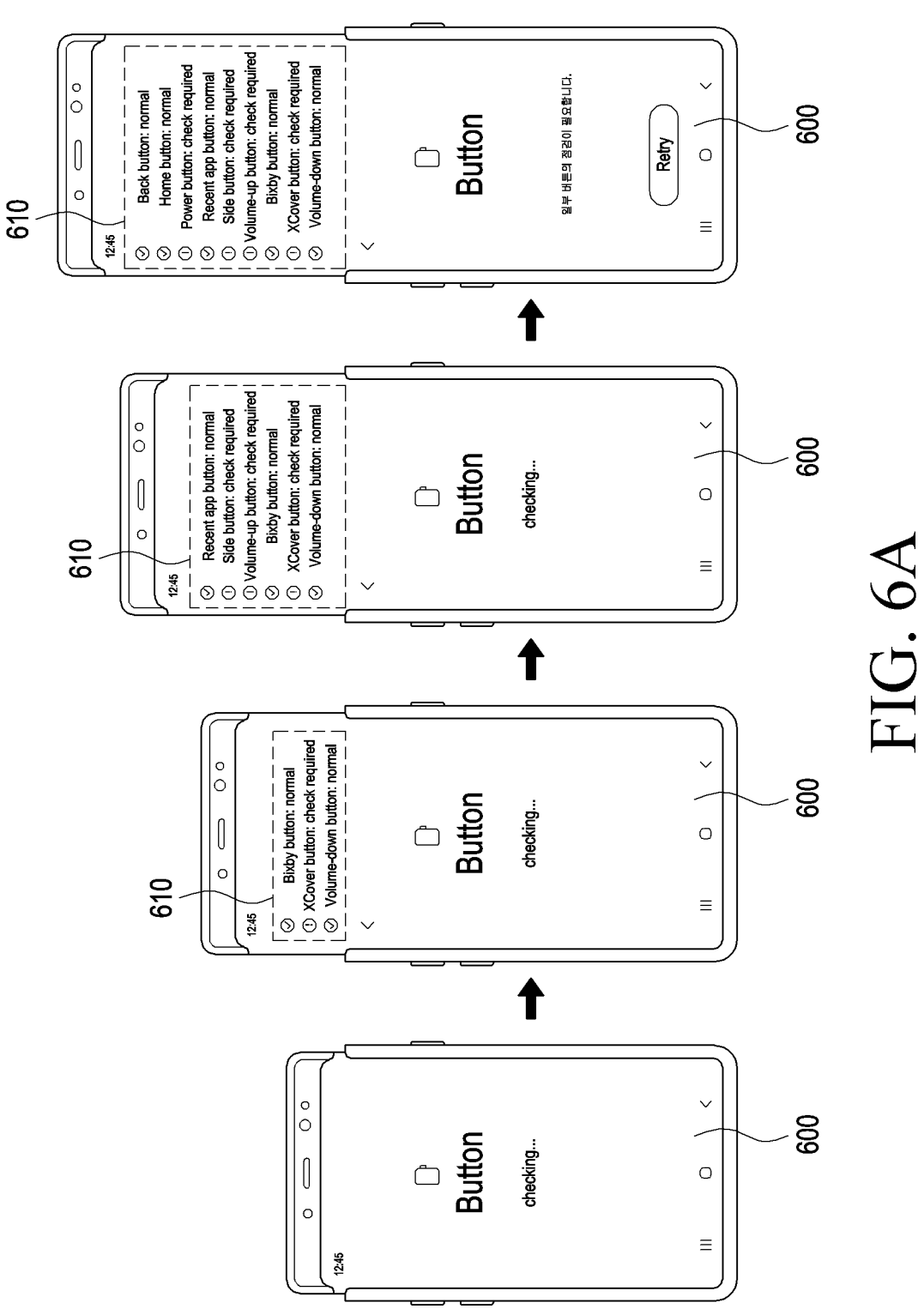
FIGS. 6A and 6B are views illustrating an embodiment of a function or operation of transforming an electronic device as a test proceeds when an event is an event of identifying a button function test according to the disclosure.
Figure 6B:
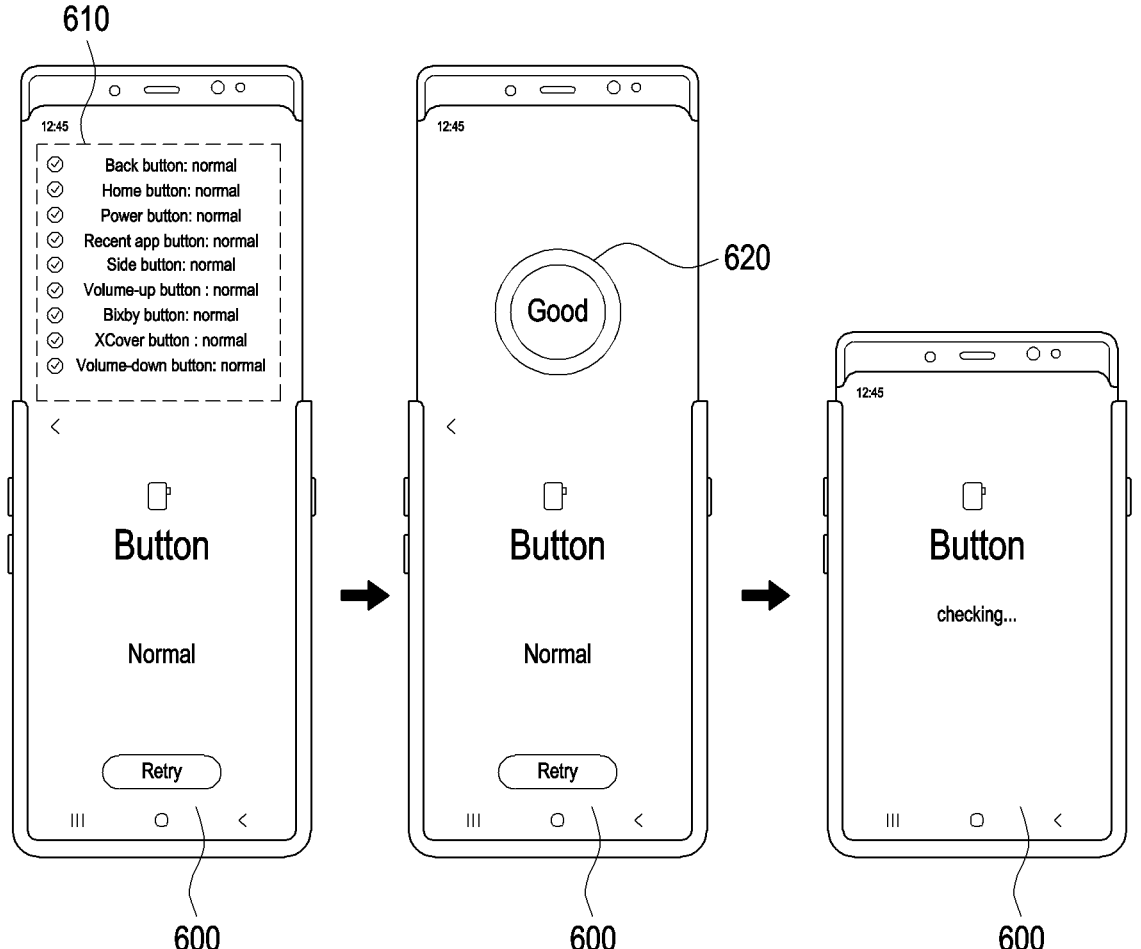

FIGS. 6A and 6B are views illustrating a function or operation of transforming an electronic device as a test proceeds when an event is an event of identifying a button function test according to the disclosure.

Referring to FIG. 6A, the electronic device 101 in an embodiment of the disclosure may control the driving module so that the state of the electronic device 101 is the fully opened state according to a test performing process when a button test function is executed in the fully closed state of the electronic device 101. The electronic device 101 in an embodiment of the disclosure may determine the current draw-out state (e.g., draw-out length) of the flexible display 600 to determine the draw-out length or the draw-out ratio with respect to the current draw-out state. In an embodiment, the electronic device 101 according to an embodiment of the disclosure may draw out the flexible display by 1.0 cm whenever each test item is done by referring to the lookup table. In another embodiment, the electronic device 101 according to an embodiment of the disclosure may draw out the flexible display by 5% of the current draw-out length from the current draw-out length, whenever each test item is done by referring to the lookup table. The electronic device 101 in an embodiment of the disclosure may provide different visual information (e.g., edge lighting) depending on the test result. FIG. 6A illustrates an embodiment in which the electronic device 101 switches from the fully closed state to the fully opened state for convenience of description. However, the disclosure is not limited thereto, and various embodiments of the disclosure may also apply even where the electronic device 101 switches from a partially closed state to the fully opened state. Referring to FIG. 6B, when all test results are normal, the final result 620 ("Good") may be displayed on the extended screen. In this case, visual information (e.g., edge lighting) having a designated color (e.g., blue) may be provided together with the final result. Further, according to an embodiment of the disclosure, when the final result is normal, the driving module may be controlled so that the state of the electronic device 101 is changed into the state at the time of starting the test (e.g., the fully closed state).

Figure 7:
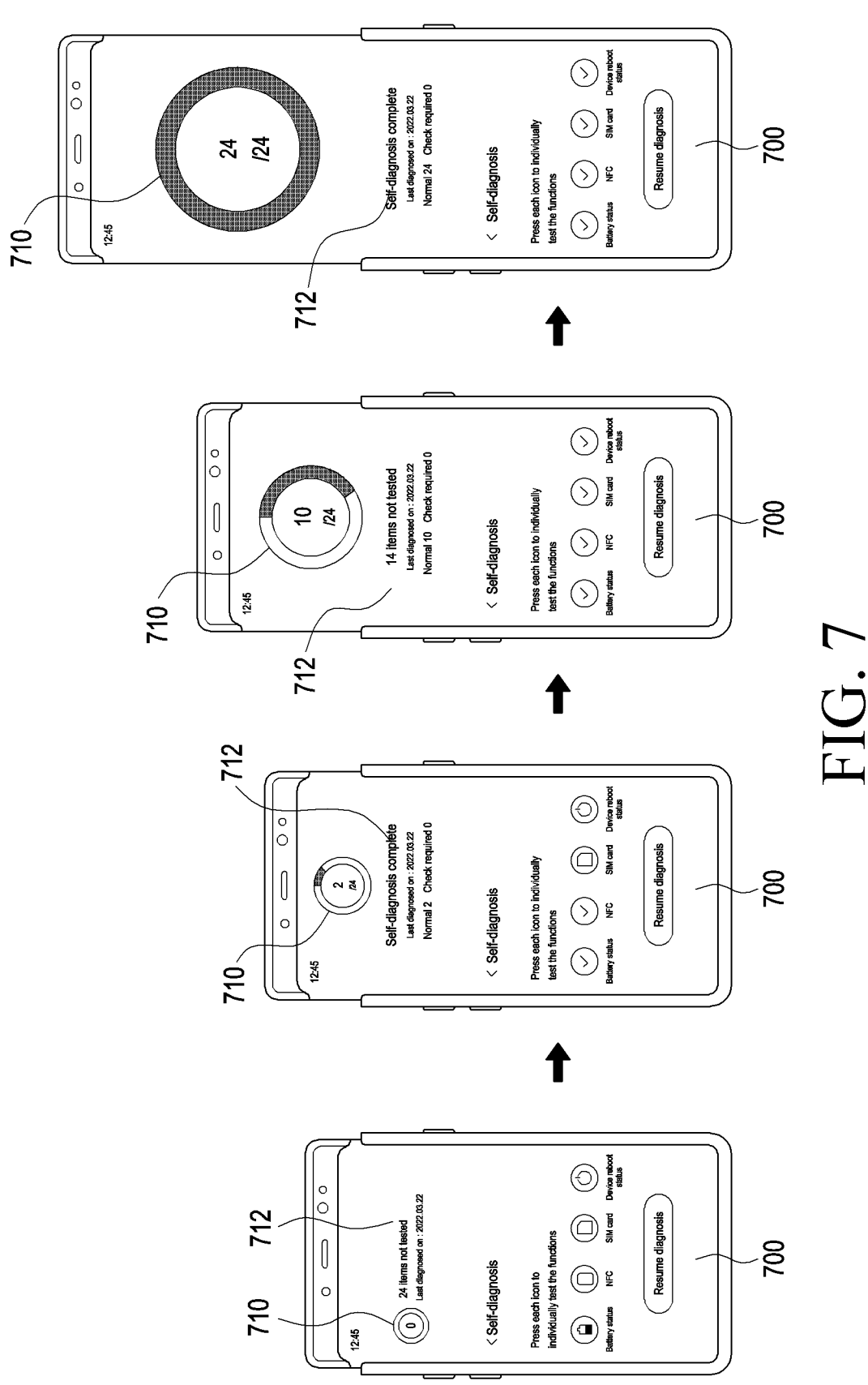
FIG. 7 is a view illustrating an embodiment of a function or operation of transforming an electronic device as diagnosis is performed when an event is an event for diagnosing the performance of the electronic device according to the disclosure.

FIG. 7 is a view illustrating a function or operation of transforming an electronic device as diagnosis is performed when an event is an event for diagnosing the performance of the electronic device according to the disclosure.

Referring to FIG. 7, the electronic device 101 in an embodiment of the disclosure may control the driving module so that the state of the electronic device 101 is the fully opened state according to a test performing process when a self-diagnosis test function is executed to identify the function (e.g., battery status, status of NFC module, or status of SIM card) of the electronic device 101 in the fully closed state of the electronic device 101. The electronic device 101 in an embodiment of the disclosure may draw out the flexible display 700 by 1.0 cm whenever each test item is done by referring to the lookup table. In another embodiment, the electronic device 101 in an embodiment of the disclosure may draw out the flexible display by 5% of the current draw-out length from the current draw-out length, whenever each test item is done by referring to the lookup table. In an embodiment of the disclosure, "5%" is a value defined in the lookup table based on the current draw-out state (e.g., draw-out length) of the flexible display. When the current draw-out state (e.g., draw-out length) of the flexible display is changed, the electronic device 101 may draw out or in the flexible display by referring to another predefined lookup table based on the changed draw-out state. In an embodiment of the disclosure, when the current draw-out length is 5 cm, the electronic device 101 may determine the draw-out length (e.g., draw-out ratio) using a lookup table made (e.g., defined or created) based on the state in which the draw-out length is 5 cm. Further, according to the disclosure, when the current draw-out length is 4 cm, the electronic device 101 may determine the draw-out length (e.g., draw-out ratio) using a lookup table made (e.g., defined or created) based on the state in which the draw-out length is 4 cm. The electronic device 101 in an embodiment of the disclosure may enlarge the progress indicator 710 indicating the current progress of diagnosis based on the extended state of the electronic device 101. In an embodiment of the disclosure, the progress indicator 710 may be displayed statically or dynamically (e.g., while rotating). The electronic device 101 in an embodiment of the disclosure may display visual information (e.g., edge lighting) having a designated color, along with the progress indicator 710 and/or detailed information 712. The electronic device 101 in an embodiment of the disclosure may also enlarge the visual information (e.g., increase the length) based on the extended state of the electronic device 101. FIG. 7 illustrates an embodiment in which the electronic device 101 switches from the fully closed state to the fully opened state for convenience of description. However, the disclosure is not limited thereto, and various embodiments of the disclosure may also apply even where the electronic device 101 switches from a partially closed state to the fully opened state.

Figure 8:
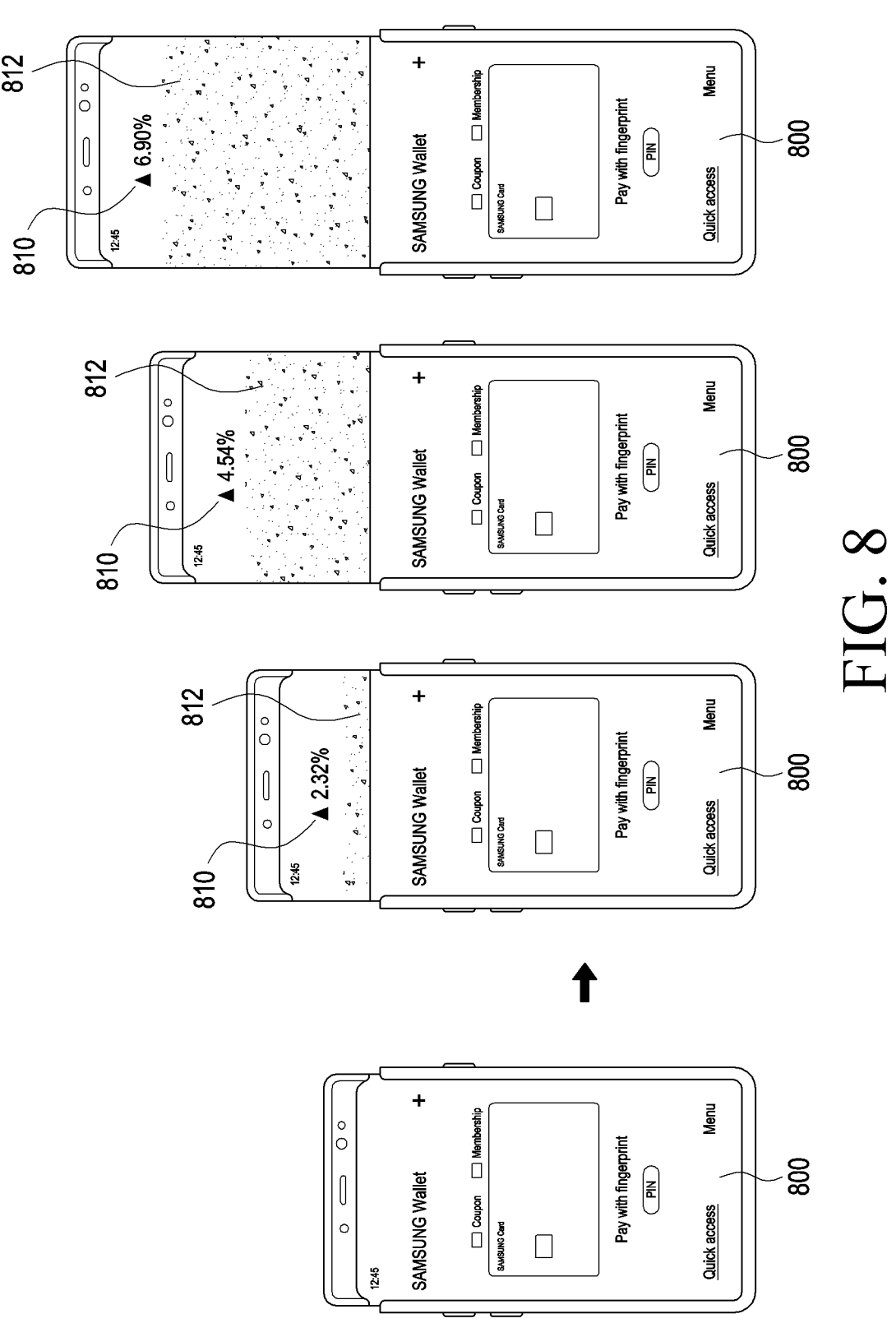
FIGS. 8 and 9 are views illustrating an embodiment of a function or operation of transforming an electronic device as a return rate increases when an event is a return rate check event according to the disclosure.
Figure 9:
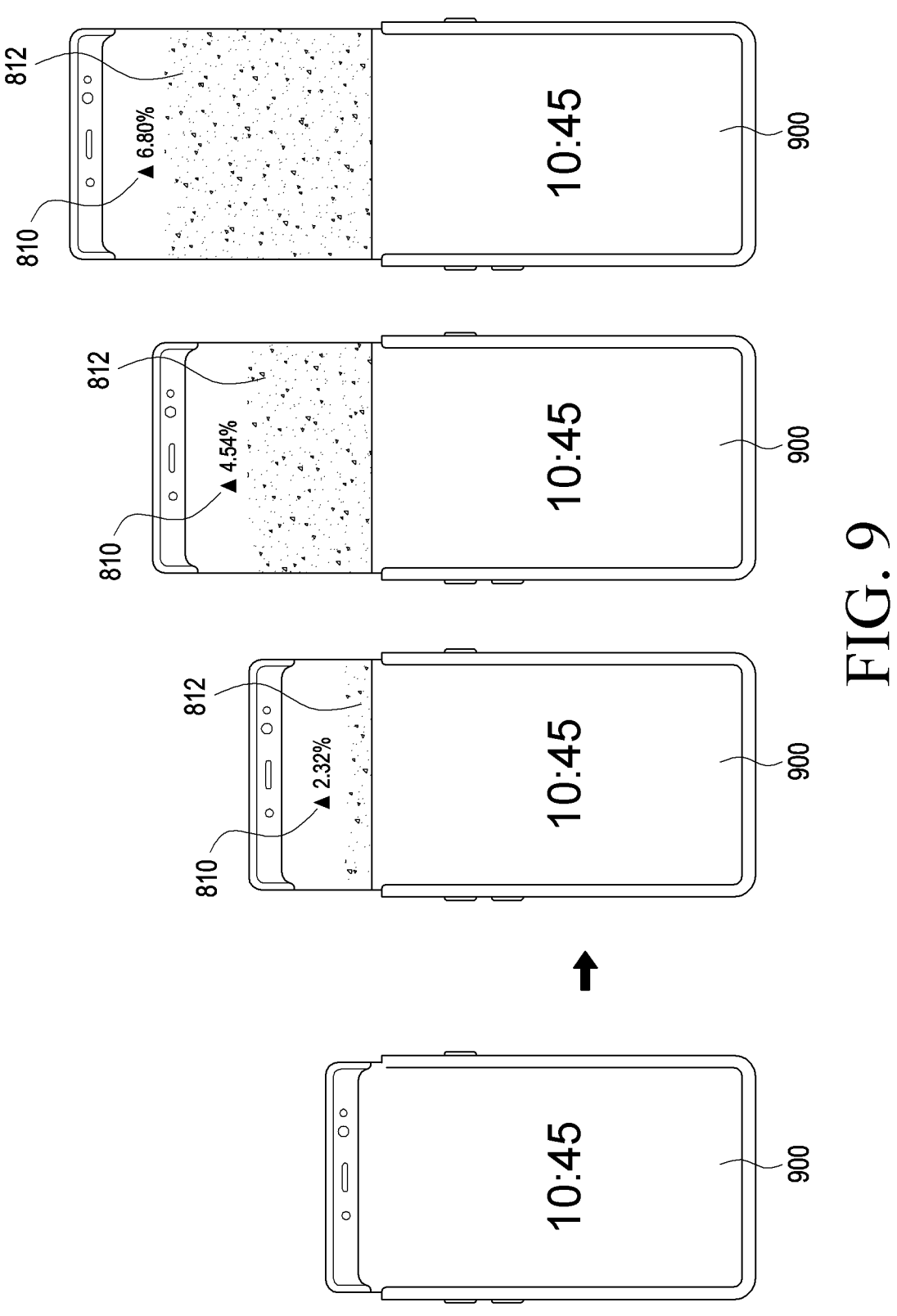

FIGS. 8 and 9 are views illustrating a function or operation of transforming an electronic device as a return rate increases when an event is a return rate check event according to the disclosure.

Referring to FIG. 8, the electronic device 101 in an embodiment of the disclosure may display an execution screen 800 of an application (e.g., Samsung® Wallet™) related to an asset return rate (e.g., an asset increase rate). The electronic device 101 in an embodiment of the disclosure may change the state of the electronic device 101 from the fully closed state to a partially or fully opened state according to an increase rate of the return rate. The electronic device 101 in an embodiment of the disclosure may display a designated visual effect 812 (e.g., a visual effect of water filling up) together with information 810 about the asset return rate. The electronic device 101 in an embodiment of the disclosure may differently change the state of the electronic device 101 depending on whether the return rate falls within a designated range. In an embodiment, when the return rate falls within a first designated range (e.g., 0.1% to 2%), the electronic device 101 according to an embodiment of the disclosure may control the driving module to draw out only by 33% of the maximum draw-out length from the fully closed state. In an embodiment, when the return rate falls within a second designated range (e.g., 2% to 5%), the electronic device 101 may control the driving module to draw out only by 66% of the maximum draw-out length from the fully closed state. In an embodiment, when the return rate falls within a third designated range (e.g., more than 5%), the electronic device 101 according to an embodiment of the disclosure may control the driving module to draw out by 100% of the maximum draw-out length from the fully closed state.

Referring to FIG. 9, the electronic device 101 in an embodiment of the disclosure may display a lock screen 900. The electronic device 101 in an embodiment of the disclosure may change the state of the electronic device 101 from the fully closed state to a partially or fully opened state according to an increase rate of the return rate. The electronic device 101 in an embodiment of the disclosure may display a designated visual effect 812 (e.g., a visual effect of water filling up) together with information about the asset return rate in a state in which the lock screen is displayed. The electronic device 101 in an embodiment of the disclosure may identify the assent return rate according to a predesignated period or the user's request (e.g., a selection input to a specific icon displayed on the lock screen) in a state in which the lock screen is displayed. The electronic device 101 in an embodiment of the disclosure may differently change the state of the electronic device 101 depending on whether the return rate falls within a designated range. In an embodiment, when the return rate falls within a first designated range (e.g., 0.1% to 2%), the electronic device 101 according to an embodiment of the disclosure may control the driving module to draw out only by 33% of the maximum draw-out length from the fully closed state, for example. In an embodiment, when the return rate falls within a second designated range (e.g., 2% to 5%), the electronic device 101 according to an embodiment of the disclosure may control the driving module to draw out only by 66% of the maximum draw-out length from the fully closed state. In an embodiment, when the return rate falls within a third designated range (e.g., more than 5%), the electronic device 101 according to an embodiment of the disclosure may control the driving module to draw out by 100% of the maximum draw-out length from the fully closed state.

Figure 10:
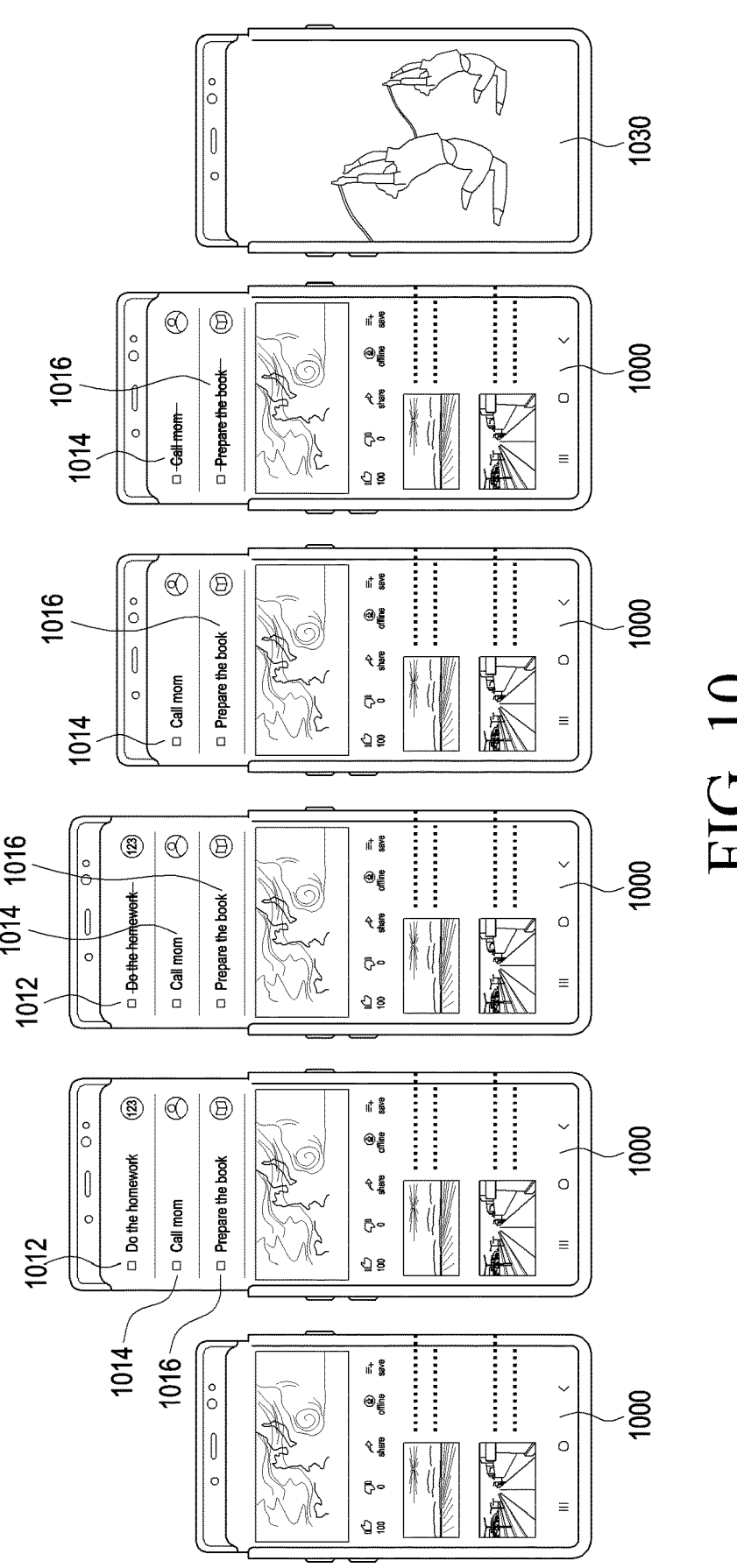
FIG. 10 is a view illustrating an embodiment of a function or operation of transforming an electronic device as a task is performed when an event is an event of completing a task according to the disclosure.

FIG. 10 is a view illustrating a function or operation of transforming an electronic device as a task is performed when an event is an event of completing a task according to the disclosure.

Referring to FIG. 10, the electronic device 101 in an embodiment of the disclosure may display an execution screen 1000 of a specific application. When a predesignated time or a time designated by the user arrives, the electronic device 101 in an embodiment of the disclosure may display a task list including at least one task (e.g., first task 1012, second task 1014, and/or third task 1016) designated by the user, along with the application execution screen 1000. The task list includes a to-do list provided via a specified application. The electronic device 101 in an embodiment of the disclosure may change its state from the fully or partially closed state into a partially or fully opened state to display the task list. In an embodiment of the disclosure, when the task is completed, the electronic device 101 may remove the completed task (e.g., calling mom) from the task list and then partially draw in the flexible display. In an embodiment, a predetermined display 1030 may appear when all tasks are completed.

Figure 11:
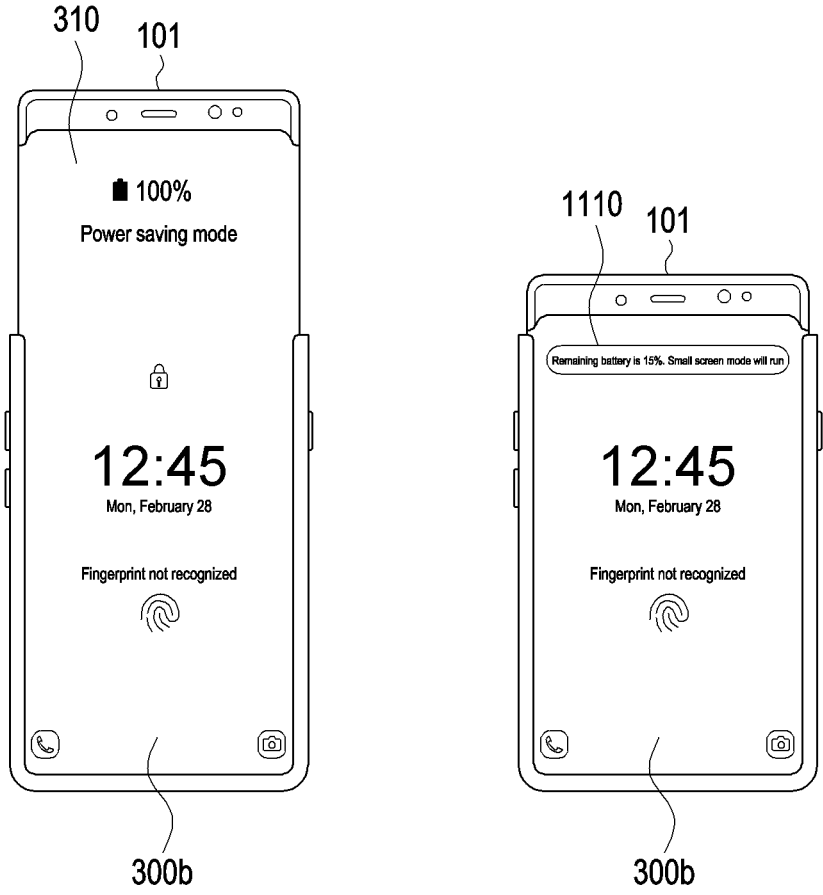
FIG. 11 is a view illustrating an embodiment of a function or operation of transforming an electronic device when the charging status of a battery is a predesignated rate or less when an event is a battery discharge event according to the disclosure.

FIG. 11 is a view illustrating a function or operation of transforming an electronic device when the charging status of a battery is a predesignated rate or less when an event is a battery discharge event according to the disclosure.

Referring to FIG. 11, when the battery level reaches a predesignated level (e.g., 15%) in a designated operation mode (e.g., power saving mode), the electronic device 101 in an embodiment of the disclosure may control the driving module so that the state of the electronic device 101 becomes the fully closed state or partially closed state corresponding to the battery level. In an embodiment, battery level information 310 and 1110 may be displayed in the extended state and the closed state, respectively.

Figure 12:
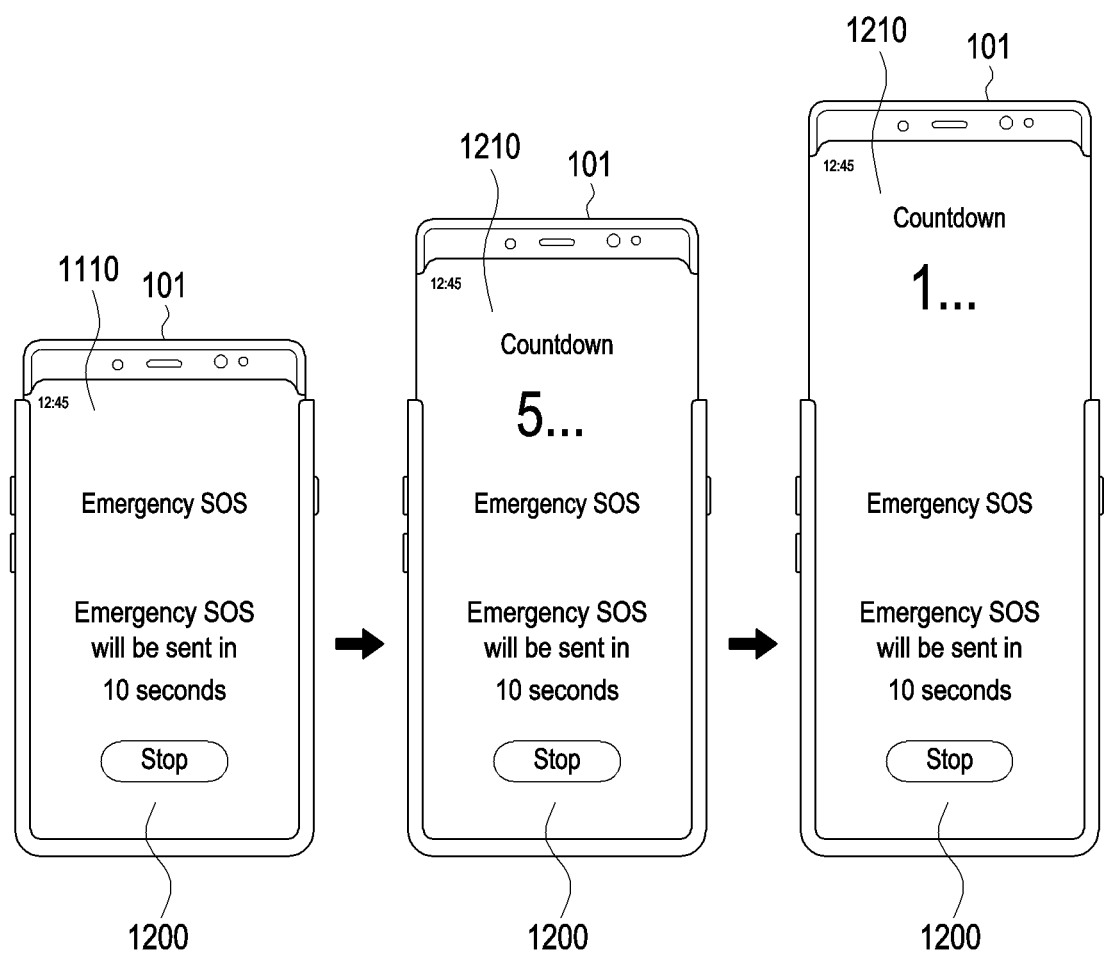
FIG. 12 is a view illustrating an embodiment of a function or operation of transforming an electronic device over time when an event is an emergency event according to the disclosure.

FIG. 12 is a view illustrating a function or operation of transforming an electronic device over time when an event is an emergency event according to the disclosure.

Referring to FIG. 12, upon receiving a message indicating that an emergency (e.g., the user's fall or crash) occurs from an external electronic device (e.g., smart watch) operably connected with the electronic device 101 and/or detecting an occurrence of the emergency by the electronic device 101, the electronic device 101 in an embodiment of the disclosure may control the driving module so that the electronic device 101 becomes the fully opened state as a designated time elapses to send a call at a predesignated phone number. In an embodiment, time elapse information 1210 may be displayed on the display 1200.

Figure 13:
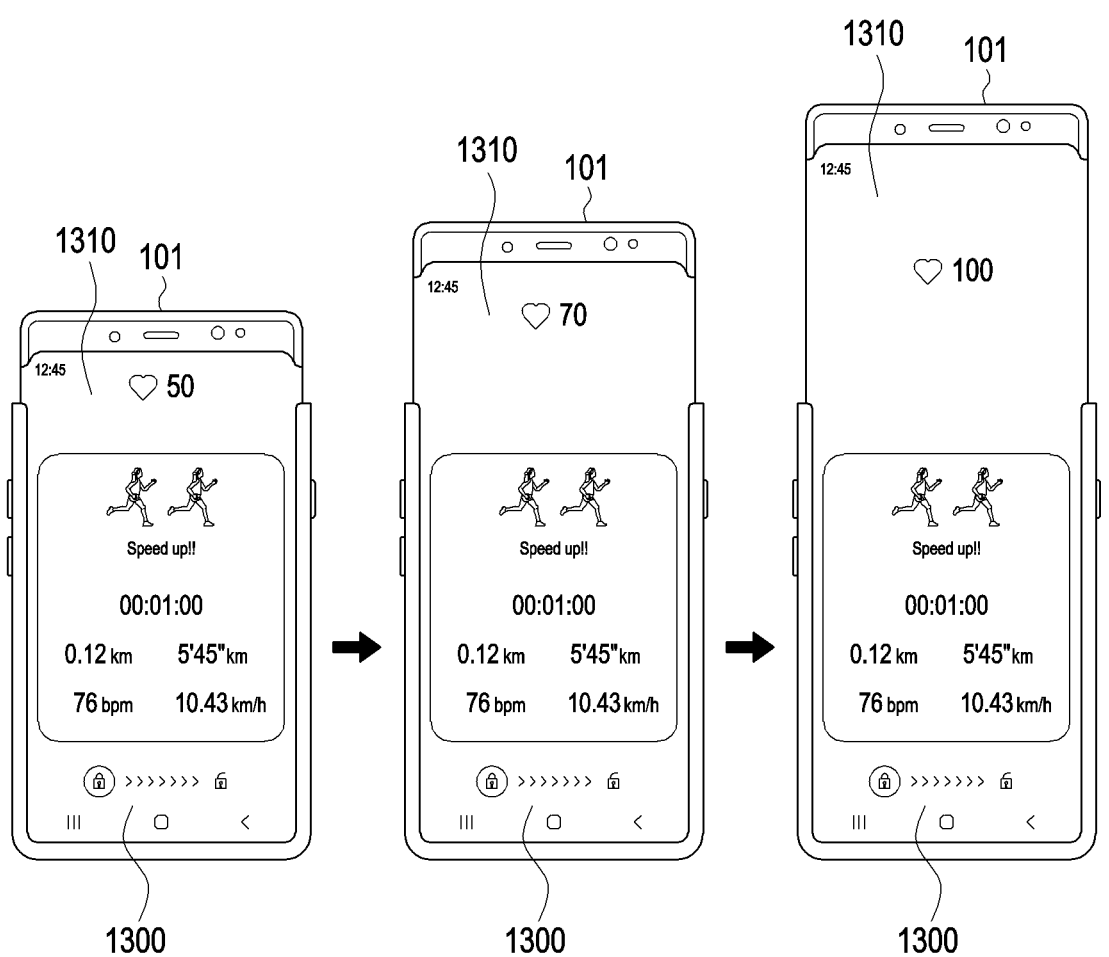
FIG. 13 is a view illustrating an embodiment of a function or operation of transforming an electronic device according to a change in biometric information when an event is an event of detecting a change in biometric information according to the disclosure.

FIG. 13 is a view illustrating a function or operation of transforming an electronic device according to a change in biometric information when an event is an event of detecting a change in biometric information according to the disclosure.

Referring to FIG. 13, the electronic device 101 in an embodiment of the disclosure may control the driving module so that the electronic device 101 becomes a partially or fully opened state according to a change in the biometric information obtained from an external electronic device (e.g., smart watch) operably connected with the electronic device 101 or obtained via the electronic device 101. The electronic device 101 in an embodiment of the disclosure may determine the draw-out length of the flexible display depending on which range the user's current biometric information (e.g., heart rate) is included in. The electronic device 101 in an embodiment of the disclosure may control the driving module so that the state of the electronic device 101 is gradually changed into the operational state or closed state according to a predesignated draw-out length. In an embodiment, when the heart rate is 50 beats per minute, the electronic device 101 according to an embodiment of the disclosure may control the driving module so that the state of the electronic device 101 is the fully closed state. When the heart rate is 50 beats or more per minute, the electronic device 101 in an embodiment of the disclosure may draw out the flexible display by 0.2 cm whenever the heart rate is increased by one per minute. In an embodiment of the disclosure, when the heart rate is more than 100 beats per minute, the electronic device 101 in an embodiment of the disclosure may control the driving module so that the state of the electronic device 101 becomes the fully opened state. In contrast, the electronic device 101 in an embodiment of the disclosure may change its state into a partially or fully closed state by a predesignated draw-out length (e.g., 0.2 cm) whenever the heart rate is reduced. In an embodiment, heart rate information 1310 may be displayed on the display 1300.

Figure 14:
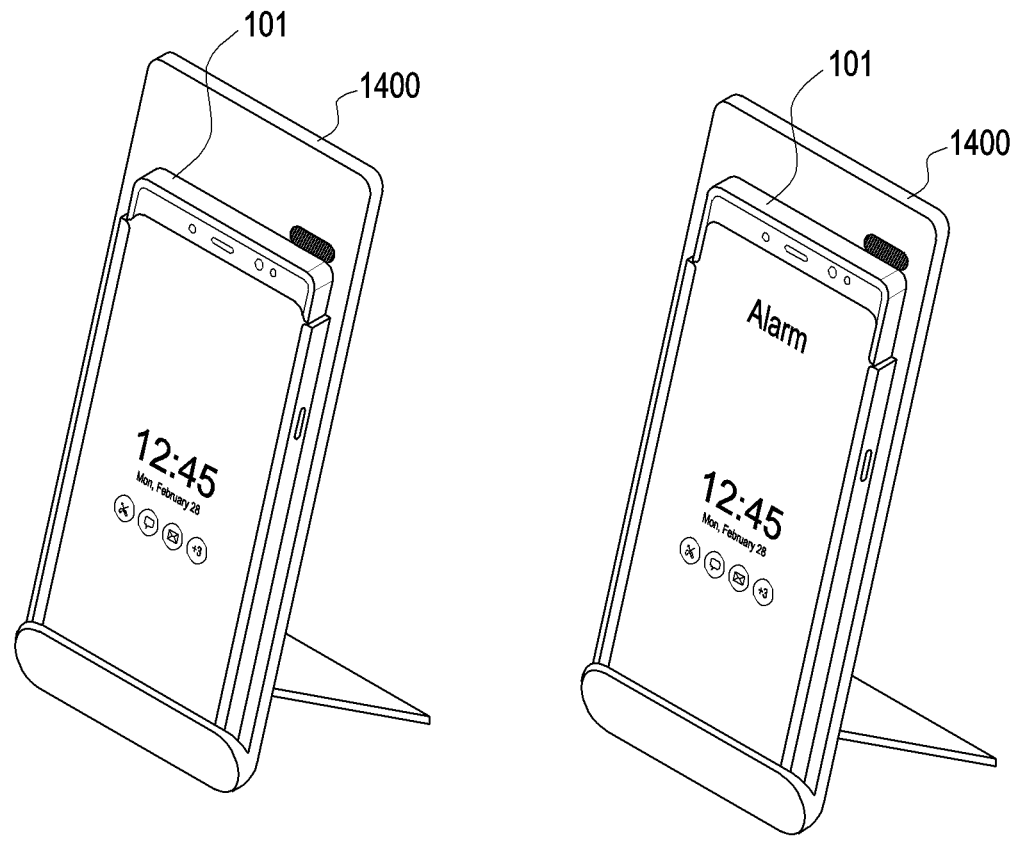
FIGS. 14 and 15 are views illustrating an embodiment of a function or operation of controlling an accessory device and/or an external electronic device operably connected with the accessory device by controlling a physical button of the accessory device according to transformation of an electronic device according to the disclosure.
Figure 15:
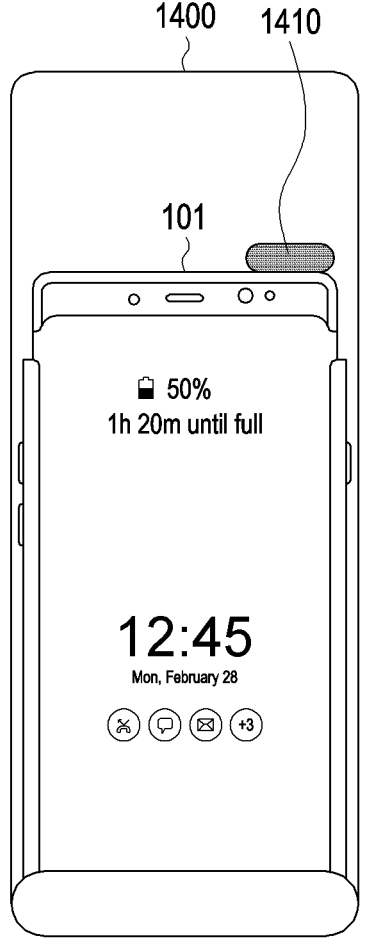
Figure 15:
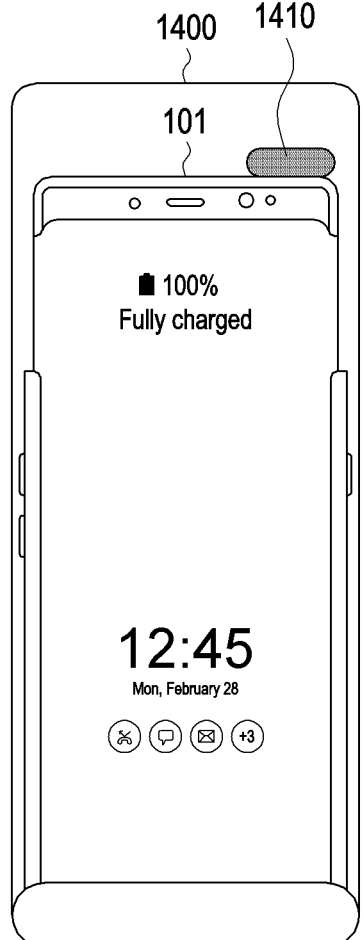

FIGS. 14 and 15 are views illustrating a function or operation of controlling an accessory device and/or an external electronic device operably connected with the accessory device by controlling a physical button of the accessory device according to transformation of an electronic device according to the disclosure.

Referring to FIGS. 14 and 15, as the electronic device 101 in an embodiment of the disclosure is changed from the fully or partially closed state to the fully opened state, a physical switch provided in an accessory device 1400 (e.g., a mount including a physical switch 1410) of the electronic device 101 may be changed from the off state to on state or from the on state to off state. The electronic device 101 in an embodiment of the disclosure may control the accessory device to terminate the function being performed by the accessory device or to perform a designated function by controlling the physical switch provided in the accessory device as shown in FIGS. 14 and 15. The electronic device 101 in an embodiment of the disclosure may control an external electronic device (e.g., a lamp) operably connected with the accessory device 1400 by controlling the physical switch 1410 of the accessory device 1400. In an embodiment, the electronic device 101 in an embodiment of the disclosure may change the external electronic device (e.g., a lamp) operably connected with the accessory device 1400 from the off state to on state by changing the physical switch 1410 of the accessory device 1400 into the on state.

Figure 16:
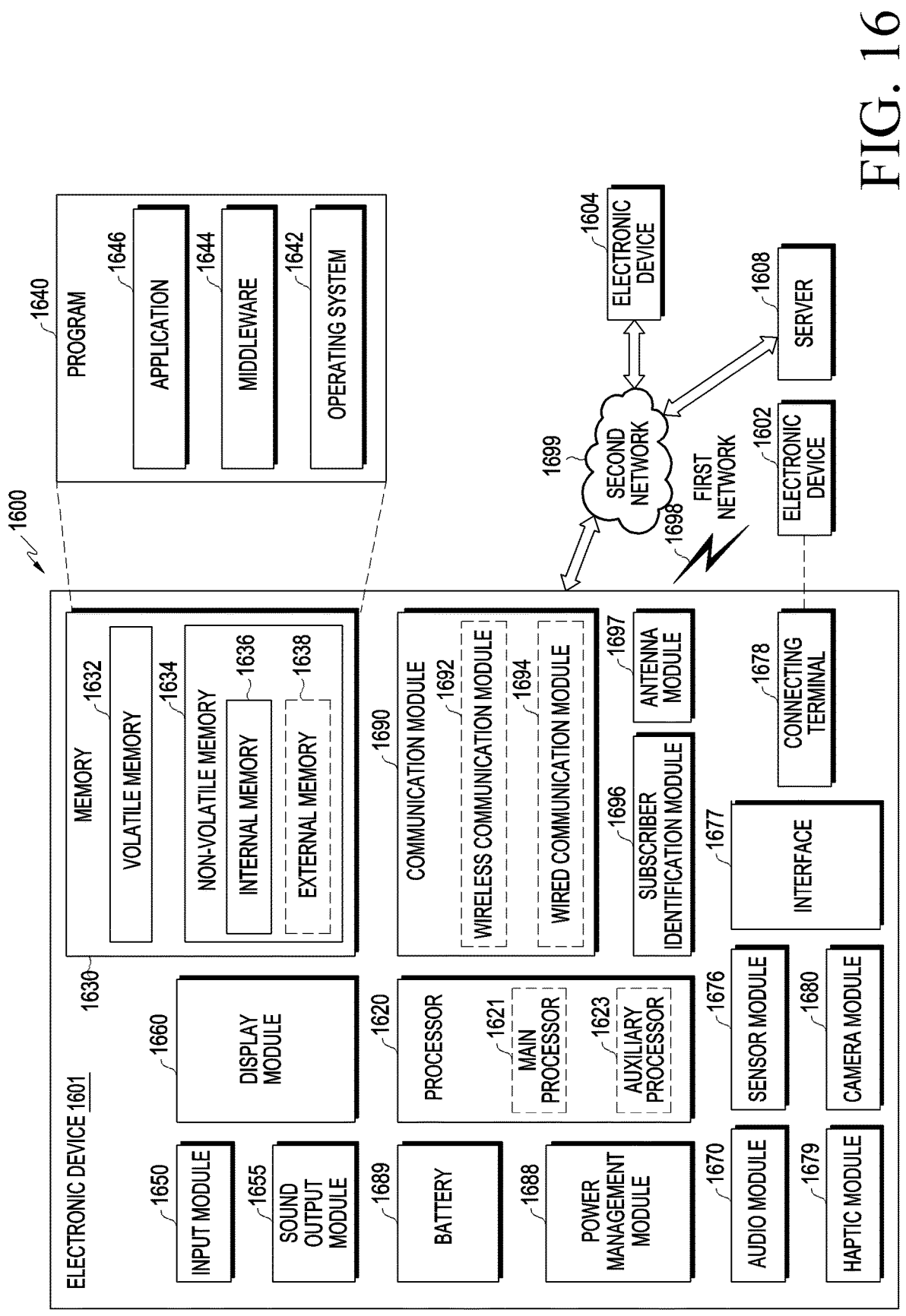
FIG. 16 is a view illustrating embodiments of an electronic device in a network environment.

FIG. 16 is a block diagram illustrating an electronic device 1601 in a network environment 1600 according to various embodiments. Referring to FIG. 16, the electronic device 1601 in the network environment 1600 may communicate with at least one of an electronic device 1602 via a first network 1698 (e.g., a short-range wireless communication network), or an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one (e.g., the connecting terminal 1678) of the components may be omitted from the electronic device 1601, or one or more other components may be added in the electronic device 101. According to an embodiment, some (e.g., the sensor module 1676, the camera module 1680, or the antenna module 1697) of the components may be integrated into a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1601 includes the main processor 1621 and the auxiliary processor 1623, the auxiliary processor 1623 may be configured to use lower power than the main processor 1621 or to be specified for a designated function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 123. According to an embodiment, the auxiliary processor 1623 (e.g., the neural processing unit) may include a hardware structure specified for artificial intelligence model processing. The artificial intelligence model may be generated via machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634. The non-volatile memory 1634 may include an internal memory 1636 and an external memory 1638.

The program 1640 may be stored in the memory 1630 as software, and may include, for example, an operating system (OS) 1642, middleware 1644, or an application 1646.

The input module 1650 may receive a command or data to be used by other component (e.g., the processor 1620) of the electronic device 1601, from the outside (e.g., a user) of the electronic device 1601. The input module 1650 may include, for example, a microphone, a mouse, a keyboard, keys (e.g., buttons), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1660 may visually provide information to the outside (e.g., a user) of the electronic device 1601. The display 1660 may include, for example, a display, a hologram device, or a projector and control circuitry to control a corresponding one of the display, hologram device, and projector. According to an embodiment, the display 1660 may include a touch sensor configured to detect a touch, or a pressure sensor configured to measure the intensity of a force generated by the touch.

The audio module 1670 may convert a sound into an electrical signal and vice versa. According to an embodiment, the audio module 1670 may obtain the sound via the input module 1650, or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 101, and then generate an electrical signal or data value corresponding to the detected state. According to an embodiment, the sensor module 1676 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or motion) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device 1604 via a first network 1698 (e.g., a short-range communication network, such as Bluetooth™, wireless-fidelity (Wi-Fi) direct, or infrared data association (IrDA)) or a second network 1699 (e.g., a long-range communication network, such as a legacy cellular network, a 5G network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module 1692 may identify or authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). According to an embodiment, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device). According to an embodiment, the antenna module 1697 may include one antenna including a radiator formed of a conductor or conductive pattern formed on a substrate (e.g., a printed circuit board (PCB)). According to an embodiment, the antenna module 1697 may include a plurality of antennas (e.g., an antenna array). In this case, at least one antenna appropriate for a communication scheme used in a communication network, such as the first network 1698 or the second network 1699, may be selected from the plurality of antennas by, e.g., the communication module 1690. The signal or the power may then be transmitted or received between the communication module 1690 and the external electronic device via the selected at least one antenna. According to an embodiment, other parts (e.g., radio frequency integrated circuit (RFIC)) than the radiator may be further formed as part of the antenna module 1697.

According to various embodiments, the antenna module 1697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. The external electronic devices 1602 or 1604 each may be a device of the same or a different type from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment, the external electronic device 1604 may include an Internet-of-things (IoT) device. The server 1608 may be an intelligent server using machine learning and/or a neural network. According to an embodiment, the external electronic device 1604 or the server 1608 may be included in the second network 1699. The electronic device 1601 may be applied to intelligent services (e.g., smart home, smart city, smart car, or health-care) based on 5G communication technology or IoT-related technology.

Figure 17:
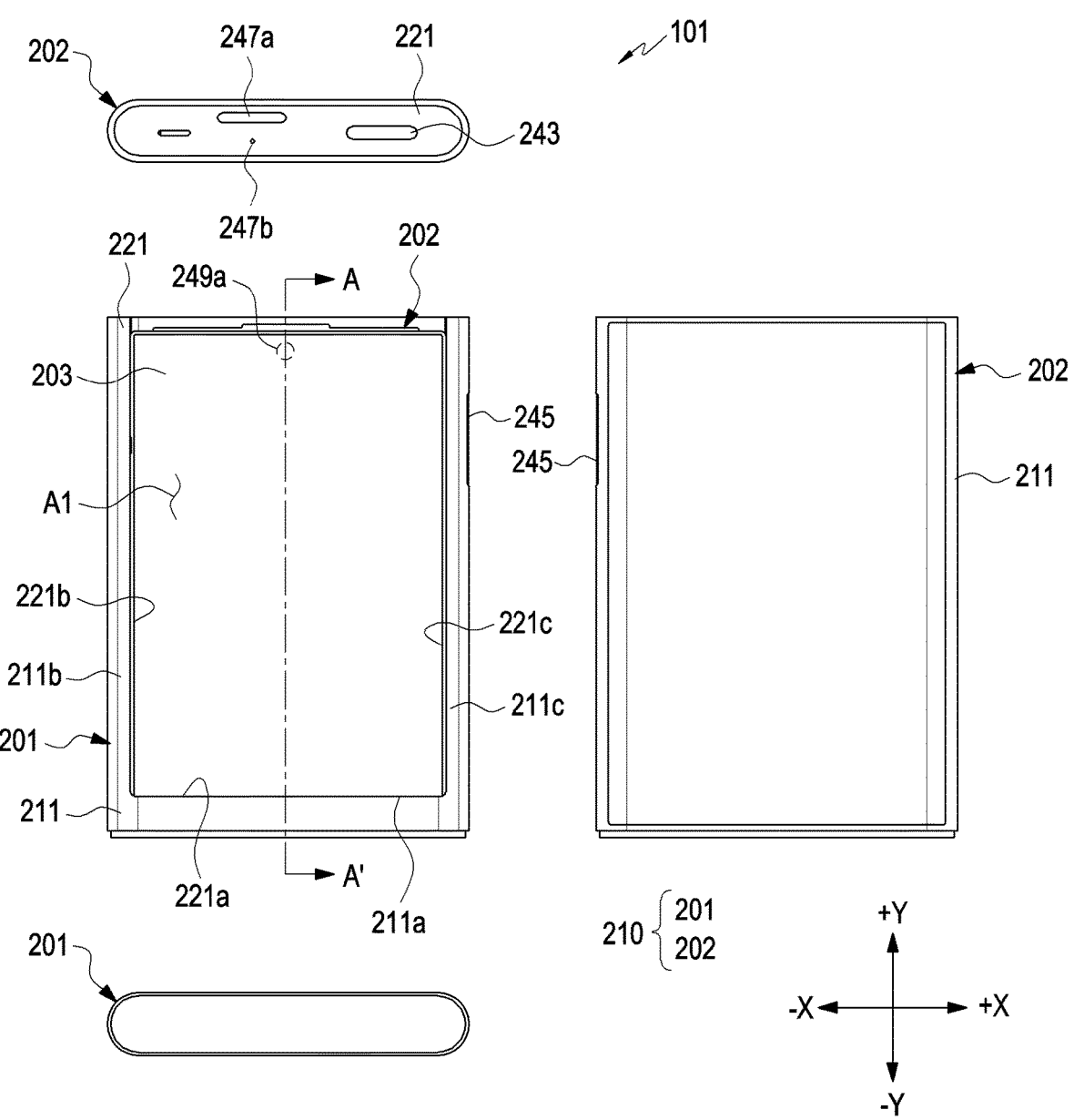
FIG. 17 is a view illustrating embodiments of a state in which a second display area of a display is received in a housing according to the disclosure.
Figure 18:
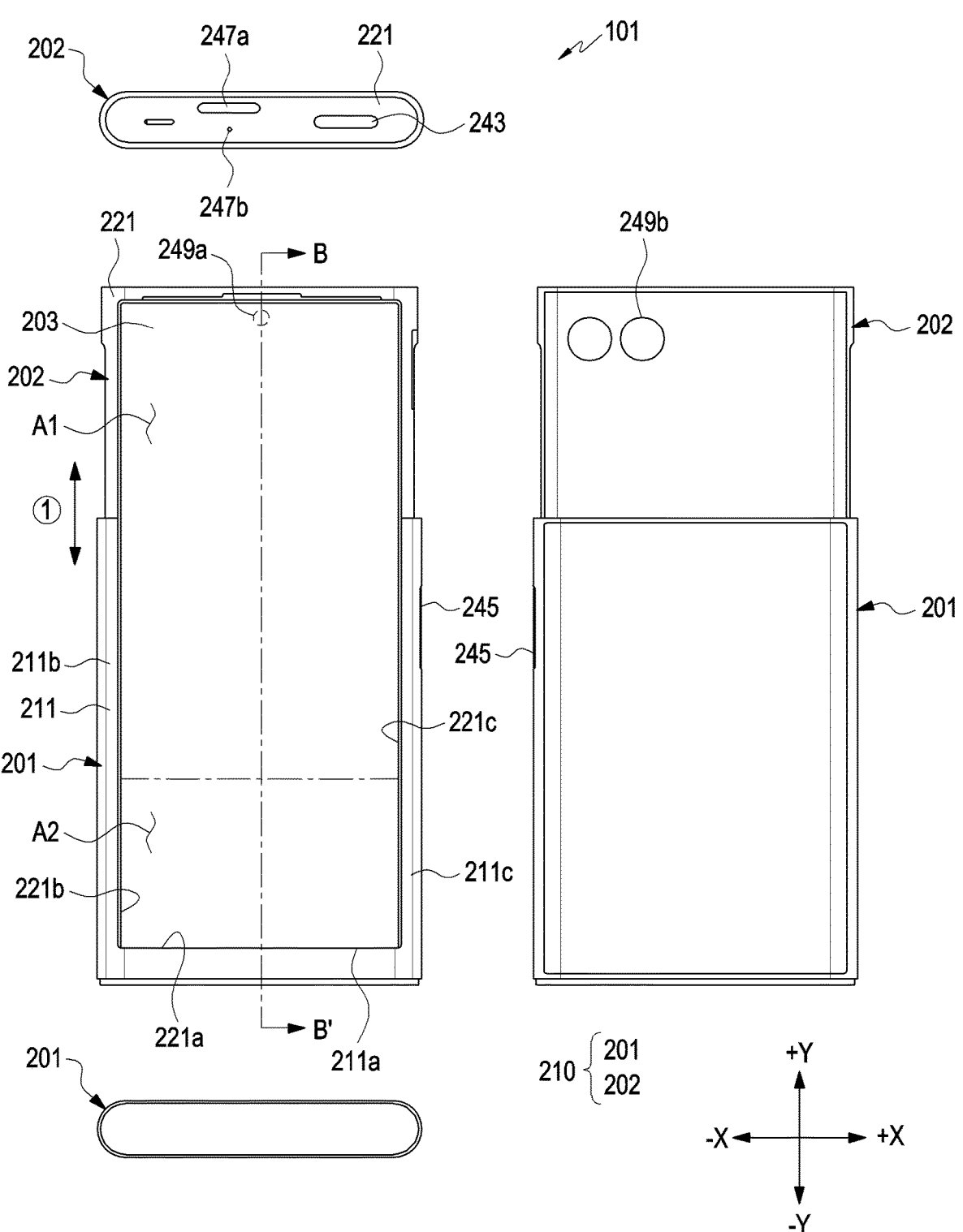
FIG. 18 is a view illustrating embodiments of a state in which a second display area of a display is exposed to the outside of a housing according to the disclosure.

FIG. 17 is a view illustrating embodiments of a state in which a second display area of a display is received in a housing according to the disclosure. FIG. 18 is a view illustrating embodiments of a state in which a second display area of a display is exposed to the outside of a housing according to the disclosure.

FIGS. 17 and 18 illustrate a structure in which the display 203 (e.g., flexible display or rollable display) is extended in the length direction (e.g., +Y direction) when the electronic device 101 is viewed from the front. However, the extending direction of the display 203 is not limited to one direction (e.g., +Y direction). In an embodiment, the extending direction of the display 203 may be changed in design to be extendable in the upper direction (+Y direction), right direction (e.g., +X direction), left direction (e.g., −X direction), and/or lower direction (e.g., −Y direction).

The state shown in FIG. 17 may be referred to as a closed state of the electronic device 101 or housing 210 and a slide-in state of the display 203.

The state shown in FIG. 18 may be referred to as an opened state of the electronic device 101 or housing 210 and a slide-out state of the display 203.

Referring to FIGS. 17 and 18, the electronic device 101 may include a housing 210. The housing 210 may include a first housing 201 and a second housing 202 disposed to be movable relative to the first housing 201. In an embodiment, the electronic device 101 may be interpreted as having a structure in which the first housing 201 is disposed to be slidable with respect to the second housing 202. In an embodiment, the second housing 202 may be disposed to perform reciprocating motion by a predetermined distance in a predetermined direction with respect to the first housing 201, e.g., a direction indicated by an arrow ①.

According to various embodiments, the second housing 202 may be also referred to as a slide portion or a slide housing, and may be movable relative to the first housing 201. In an embodiment, the second housing 202 may receive various electrical/electronic components, such as a circuit board or a battery.

In an embodiment, a motor, a speaker, a sim socket, and/or a sub circuit board electrically connected with a main circuit board may be disposed in the first housing 201. The second housing 202 may receive a main circuit board on which electric components, such as an application processor (AP) and a communication processor (CP) are disposed (e.g., mounted).

According to various embodiments, the first housing 201 may include a first cover member 211 (e.g., a main case). The first cover member 211 may include a 1-1th sidewall 211a, a 1-2th sidewall 211b extending from the 1-1th sidewall 211a, and a 1-3th sidewall 211c extending from the 1-1th sidewall 211a and substantially parallel to the 1-2th sidewall 211b. In an embodiment, the 1-2th sidewall 211b and the 1-3th sidewall 211c may be formed substantially perpendicular to the 1-1th sidewall 211a.

According to various embodiments, the 1-1th sidewall 211a, 1-2th sidewall 211b, and 1-3th sidewall 211c of the first cover member 211 may be formed to have a side opening (e.g., in the front surface) to receive at least a portion of the second housing 202. In an embodiment, at least a portion of the second housing 202 may be surrounded by the first housing 201 and be slid in the direction parallel to the first surface (e.g., the first surface F1 of FIG. 19), e.g., arrow ①direction, while being guided by the first housing 201. In an embodiment, the 1-1th sidewall 211a, the 1-2th sidewall 211b, and/or the 1-3th sidewall 211c of the first cover member 211 may be unitary. In an embodiment, the 1-1th sidewall 211a, the 1-2th sidewall 211b, and/or the 1-3th sidewall 211c of the first cover member 211 may be formed as separate structures and be combined or assembled.

According to various embodiments, the first cover member 211 may be formed to surround at least a portion of the display 203. In an embodiment, at least a portion of the display 203 may be formed to be surrounded by the 1-1th sidewall 211a, the 1-2th sidewall 211b, and/or the 1-3th sidewall 211c of the first cover member 211.

According to various embodiments, the second housing 202 may include a second cover member 221 (e.g., a slide plate). The second cover member 221 may have a plate shape and include a first surface (e.g., the first surface F1 of FIG. 19) supporting internal components. In an embodiment, the second cover member 221 may support at least a portion of the display 203 (e.g., the first display area A1). In an embodiment, the second cover member 221 may be referred to as a front cover.

In an embodiment, the second cover member 221 may include a 2-1th sidewall 221a, a 2-2th sidewall 221b extending from the 2-1th sidewall 221a, and a 2-3th sidewall 221c extending from the 2-1th sidewall 221a and substantially parallel to the 2-2th sidewall 221b. In an embodiment, the 2-2th sidewall 221b and the 2-3th sidewall 221c may be formed substantially perpendicular to the 2-1th sidewall 221a.

According to various embodiments, as the second housing 202 moves in a first direction (e.g., direction ①) parallel to the 1-2th sidewall 211b or the 1-2th sidewall 211c, the housing 210 may form an opened state and a closed state. In the closed state, the second housing 202 may be disposed at a first distance from the 1-1th sidewall 211a and, in the opened state, the second housing 202 may be moved to be disposed at a second distance larger than the first distance from the 1-1th sidewall 211a. In some embodiments, in the closed state, the first housing 201 may surround a portion of the 2-1th sidewall 221a.

According to various embodiments, the electronic device 101 may include a display 203, a key input device 245, a connector hole 243, audio modules 247a and 247b, or camera modules 249a and 249b. In an embodiment, the electronic device 101 may further include an indicator (e.g., a light emitting diode (LED) device) or various sensor modules.

According to various embodiments, the display 203 may include a first display area A1 and a second display area A2 configured to be exposed to the outside of the electronic device 101 based on the slide of the second housing 202. In an embodiment, the first display area A1 may be disposed on the second housing 202. In an embodiment, the first display area A1 may be disposed on the second cover member 221 of the second housing 202. In an embodiment, the second display area A2 may extend from the first display area A1, and as the second housing 202 slides relative to the first housing 201, the second display area A2 may be received in the first housing 201 (e.g., the slide-in state) or be visually exposed to the outside of the electronic device 101 (e.g., the slide-out state).

According to various embodiments, the second display area A2 may be moved while being substantially guided by one area (e.g., the curved surface 213a of FIG. 19) of the first housing 201 and be received in the space positioned in the first housing 201 or exposed to the outside of the electronic device 101. In an embodiment, the second display area A2 may move based on a slide of the second housing 202 in the first direction (e.g., the direction indicated by the arrow ①). In an embodiment, while the second housing 202 slides, a portion of the second display area A2 may be deformed into a curved shape in a position corresponding to the curved surface 213a of the first housing 201.

According to various embodiments, when viewed from above the second cover member 221 (e.g., front cover), when an electronic device 101 (refer to FIG. 19) changes from the closed state to opened state (e.g., when the second housing 202 slides to extend from the first housing 201), the second display area A2 may be gradually exposed to the outside of the first housing 201 and, together with the first display area A1, form a substantially flat surface. In an embodiment, the display 203 may be coupled with or disposed adjacent to a touch detection circuit, a pressure sensor capable of measuring the strength (pressure) of touches, and/or a digitizer for detecting a magnetic field-type stylus pen. In an embodiment, irrespective of the closed state or opened state of the housing 210, the exposed portion of the second display area A2 may be disposed on a portion (e.g., the curved surface 213a of FIG. 19) of the first housing, and a portion of the second display area A2 may remain in the curved shape in the position corresponding to the curved surface 213a.

According to various embodiments, the key input device 245 may be disposed in one area of the first housing 201. Depending on the appearance and the state of use, the electronic device 101 may be designed to omit the illustrated key input device 245 or to include additional key input device(s). In an embodiment, the electronic device 101 may include a key input device (not shown), e.g., a home key button or a touchpad disposed around the home key button. In an embodiment, at least a portion of the key input device 245 may be disposed on the 1-1th sidewall 211a, the 1-2th sidewall 211b, or the 1-3th sidewall 211c of the first housing 201.

According to various embodiments, the connector hole 243 may be omitted or may receive a connector (e.g., a universal serial bus (USB) connector) for transmitting and receiving power and/or data with an external electronic device. In an embodiment (not shown), the electronic device 101 may include a plurality of connector holes 243, and some of the plurality of connector holes 243 may function as connector holes for transmitting/receiving audio signals with an external electronic device. In the illustrated embodiment, the connector hole 243 is disposed in the second housing 202, but is not limited thereto. In an embodiment, the connector hole 243 or a connector hole not shown may be disposed in the first housing 201.

According to various embodiments, the audio modules 247a and 247b may include at least one speaker hole 247a or at least one microphone hole 247b. One of the speaker holes 247a may be provided as a receiver hole for voice calls, and the other may be provided as an external speaker hole. The electronic device 101 may include a microphone for obtaining sound. The microphone may obtain external sound of the electronic device 101 through the microphone hole 247b. In an embodiment, the electronic device 101 may include a plurality of microphones to detect the direction of sound. In an embodiment, the electronic device 101 may include an audio module in which the speaker hole 247a and the microphone hole 247b are implemented as one hole or may include a speaker without the speaker hole 247a (e.g., a piezo speaker).

According to various embodiments, the camera modules 249a and 249b may include a first camera module 249a (e.g., a front camera) and a second camera module 249b (e.g., a rear camera) (e.g., the second camera module 249b of FIGS. 5A and 5B). In an embodiment, the electronic device 101 may include at least one of a wide-angle camera, a telephoto camera, or a close-up camera. In an embodiment, the electronic device 101 may measure the distance to the subject by including an IR projector and/or an IR receiver. The camera modules 249a and 249b may include one or more lenses, an image sensor, and/or an image signal processor. The first camera module 249a may be disposed to face in the same direction as the display 203. In an embodiment, the first camera module 249a may be disposed in an area around the first display area A1 or overlapping the display 203. When disposed in the area overlapping the display 203, the first camera module 249a may capture the subject through the display 203. In an embodiment, the first camera module 249a may include an under display camera (UDC) that has a screen display area (e.g., the first display area A1) that may not be visually exposed but hidden. In an embodiment, the second camera module 249b may capture the subject in a direction opposite to the first display area A1. In an embodiment, the first camera module 249a and/or the second camera module 249b may be disposed on the second housing 202.

According to various embodiments, an indicator (not shown) of the electronic device 101 may be disposed on the first housing 201 or the second housing 202, and the indicator may include a light emitting diode to provide state information about the electronic device 101 as a visual signal. The sensor module (not shown) of the electronic device 101 may produce an electrical signal or data value corresponding to the internal operation state or external environment state of the electronic device. The sensor module may include, e.g., a proximity sensor, a fingerprint sensor, or a biometric sensor (e.g., an iris/face recognition sensor or a heartrate monitor (HRM) sensor). In another embodiment, the sensor module may further include, e.g., at least one of a gesture sensor, a gyro sensor, an atmospheric pressure sensor, a magnetic sensor, an acceleration sensor, a grip sensor, a color sensor, an IR sensor, a temperature sensor, a humidity sensor, or an illuminance sensor.

Figure 19:
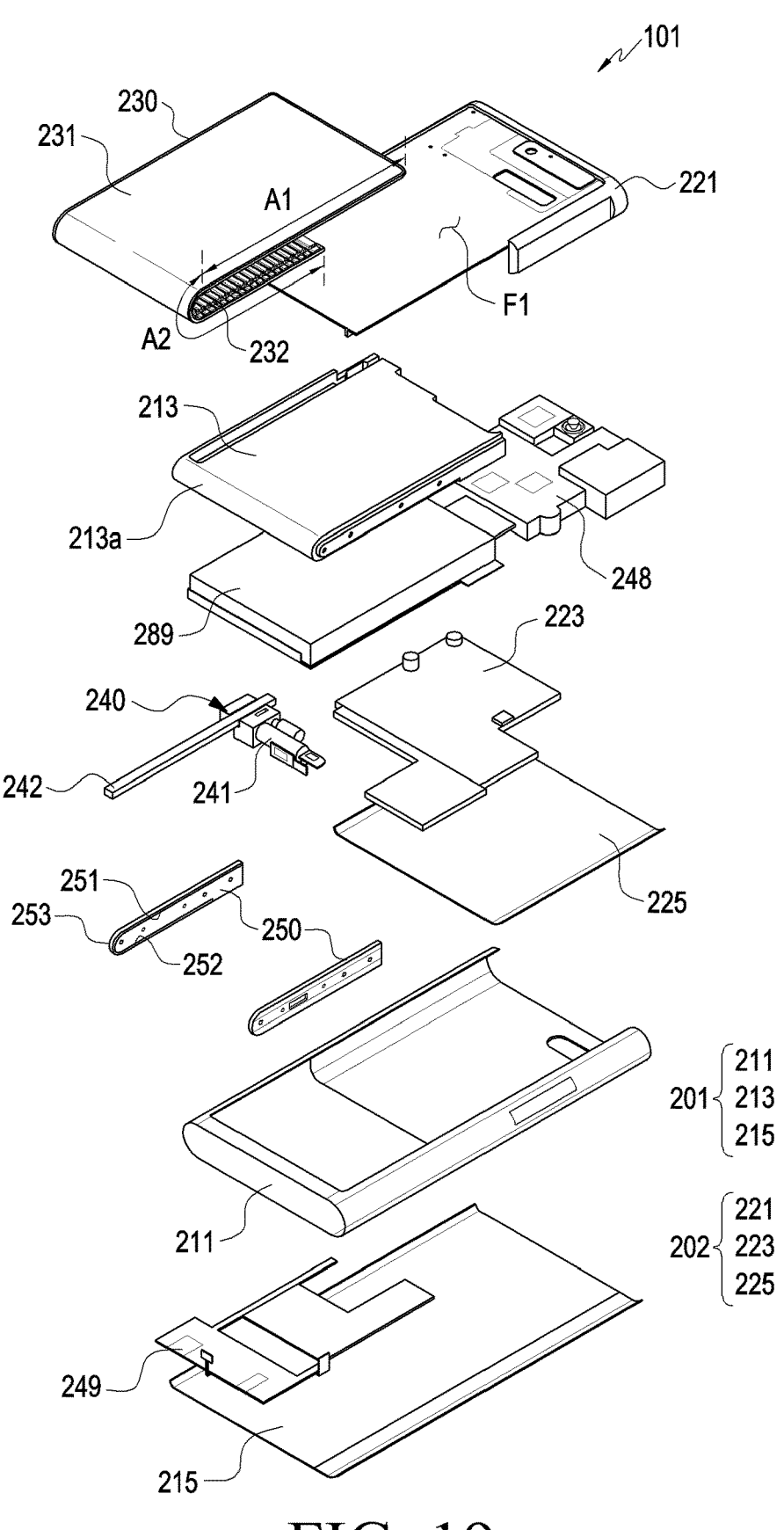
FIG. 19 is an exploded perspective view illustrating embodiments of an electronic device according to the disclosure.

FIG. 19 is an exploded perspective view illustrating embodiments of an electronic device according to the disclosure.

Figure 20A:
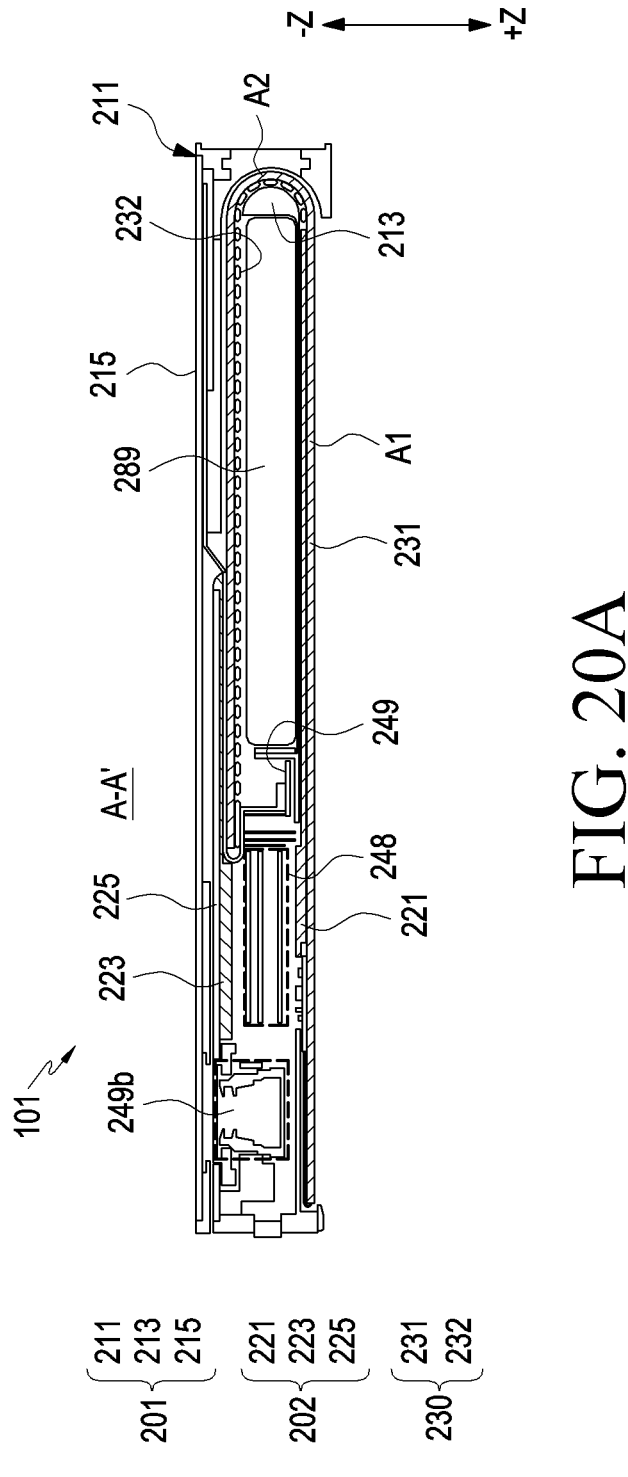
FIG. 20A is a cross-sectional view taken along line A-A' of embodiments of FIG. 17 according to the disclosure.

FIG. 20A is a cross-sectional view taken along line A-A' of embodiments of FIG. 17 according to the disclosure.

Figure 20B:
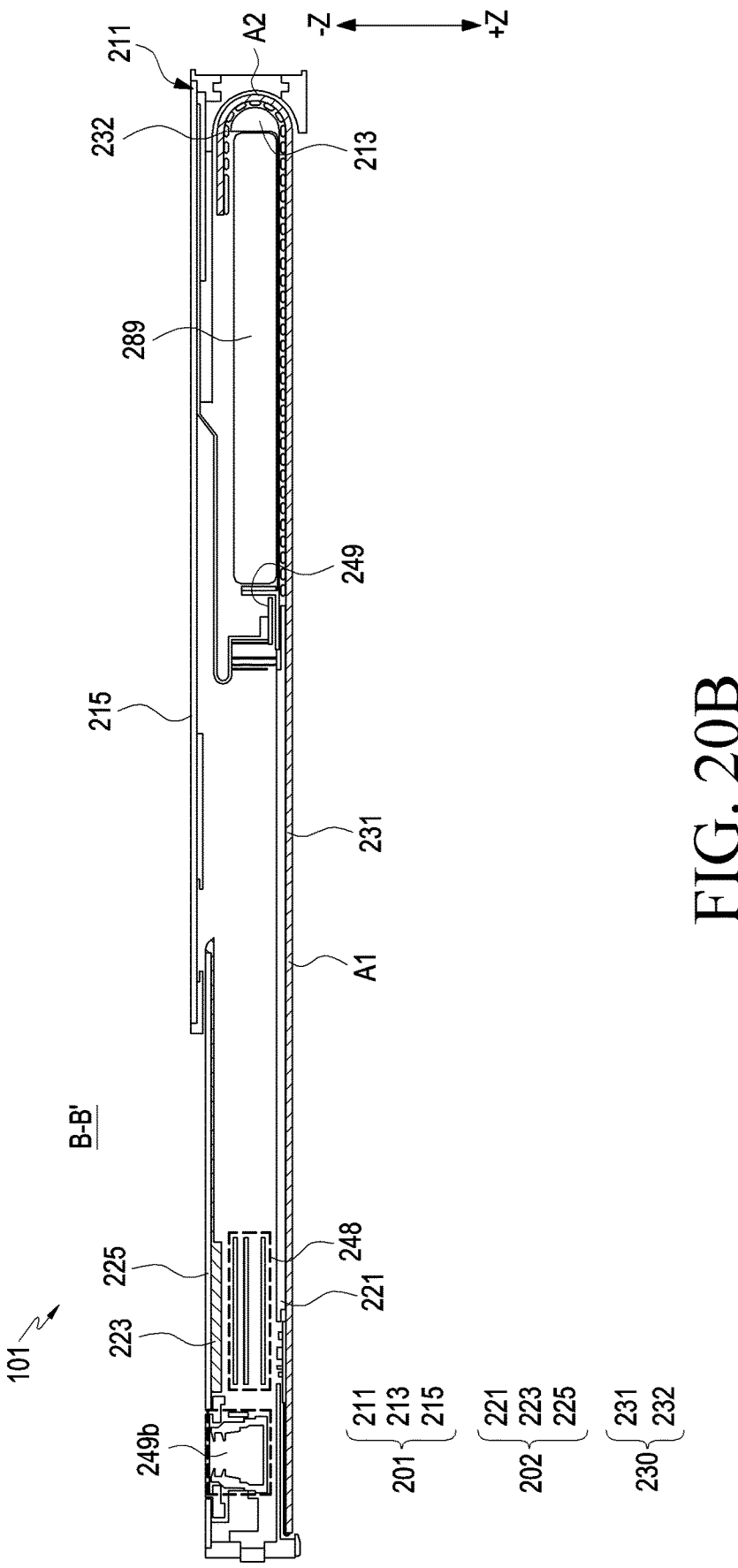
FIG. 20B is a cross-sectional view taken along line B-B' of embodiments of FIG. 18 according to the disclosure.

FIG. 20B is a cross-sectional view taken along line B-B' of embodiments of FIG. 18 according to the disclosure.

Referring to FIGS. 19, 20A, and/or 20B, an electronic device 101 may include a first housing 201, a second housing 202, a display assembly 230, and a driving structure 240. The configuration of the first housing 201, the second housing 202, and the display assembly 230 of FIGS. 19, 20A, and/or 20B may be identical in whole or part to the configuration of the first housing 201, the second housing 202, and the display 203 of FIGS. 17 and/or 18.

According to various embodiments, the first housing 201 may include a first cover member 211 (e.g., the first cover member 211 of FIGS. 17 and 18), a frame 213, and a first rear plate 215.

According to various embodiments, the first cover member 211 may receive at least a portion of the frame 213 and receive a component (e.g., battery 289) disposed in the frame 213. In an embodiment, the first cover member 211 may be formed to surround at least a portion of the second housing 202. In an embodiment, the second circuit board 249 receiving the electronic component (e.g., the processor 1620 and/or the memory 1630 of FIG. 16) may be connected to the first cover member 211.

According to various embodiments, the frame 213 may be connected to the first cover member 211. In an embodiment, the frame 213 may be connected to the first cover member 211. The second housing 202 is movable relative to the first cover member 211 and/or the frame 213. In an embodiment, the frame 213 may receive the battery 289. In an embodiment, the frame 213 may include a curved surface (or curved portion) 213a facing the display assembly 230.

According to various embodiments, the first rear plate 215 may substantially form at least a portion of the exterior of the first housing 201 or the electronic device 101. In an embodiment, the first rear plate 215 may be coupled to the outer surface of the first cover member 221, for example. In an embodiment, the first rear plate 215 may provide a decorative effect on the exterior of the electronic device 101.

The first rear plate 215 may include or consist of at least one of metal, glass, synthetic resin, or ceramic.

According to various embodiments, the second housing 202 may include a second cover member 221 (e.g., the second cover member 221 of FIGS. 17 and 18), a rear cover 223, and a second rear plate 225.

In an embodiment, the second cover member 221 may be connected to the first housing 201 through the guide rail 250 and, while being guided by the guide rail 250, reciprocate linearly in one direction (e.g., the direction of arrow ① in FIG. 18).

According to various embodiments, the second cover member 221 may support at least a portion of the display 203. In an embodiment, the second cover member 221 may include a first surface F1, for example. The first display area A1 of the display 203 may be substantially disposed on the first surface F1 to maintain a flat panel shape. In an embodiment, the second cover member 221 may include or consist of a metal material and/or a non-metal (e.g., polymer) material. In an embodiment, the first circuit board 248 receiving the electronic component (e.g., the processor 1620 and/or the memory 1630 of FIG. 16) may be connected to the second cover member 221.

According to various embodiments, the rear cover 223 may protect a component (e.g., the first circuit board 248) disposed on the second cover member 221. In an embodiment, the rear cover 223 may be connected to the second cover member 221 and may be formed to surround at least a portion of the first circuit board 248, for example. In an embodiment, the rear cover 223 may include an antenna pattern for communicating with an external electronic device. In an embodiment, the rear cover 223 may include a laser direct structuring (LDS) antenna, for example.

According to various embodiments, the second rear plate 225 may substantially form at least a portion of the exterior of the second housing 202 or the electronic device 101. In an embodiment, the second rear plate 225 may be coupled to the outer surface of the second cover member 221, for example. In an embodiment, the second rear plate 225 may provide a decorative effect on the exterior of the electronic device 101. The second rear plate 215 may include or consist of at least one of metal, glass, synthetic resin, or ceramic.

According to various embodiments, the display assembly 230 may include a display 231 (e.g., the display 203 of FIGS. 17 and/or 18) and a multi-bar structure 232 supporting the display 203. In an embodiment, the display 231 may be referred to as a flexible display, a foldable display, and/or a rollable display.

According to various embodiments, the multi-bar structure 232 may be connected to or attached to at least a portion (e.g., the second display area A2) of the display 231. In an embodiment, as the second housing 202 slides, the multi-bar structure 232 may move with respect to the first housing 201. In the closed state of the electronic device 101 (e.g., FIG. 17), the multi-bar structure 232 may be mostly received in the first housing 201 and may be disposed between the first cover member 211 and the second cover member 221. In an embodiment, at least a portion of the multi-bar structure 232 may move corresponding to the curved surface 213a disposed at the edge of the frame 213. In an embodiment, the multi-bar structure 232 may be referred to as a display supporting member or supporting structure and may be in the form of one elastic plate.

According to various embodiments, the driving structure 240 may move the second housing 202 relative to the first housing 201. In an embodiment, the drive structure 240 may include a motor 241 configured to generate a driving force for sliding the housing 201 and 202. The driving structure 240 may include a gear (e.g., a pinion) connected to the motor 241 and a rack 242 configured to mesh with the gear.

According to various embodiments, the housing in which the rack 242 is disposed and the housing in which the motor 241 is disposed may be different. In an embodiment, the motor 241 may be connected to the second housing 202. The rack 242 may be connected to the first housing 201. In another embodiment, the motor 241 may be connected to the first housing 201. The rack 242 may be connected to the second housing 202.

According to various embodiments, the first housing 201 may receive the first circuit board 248 (e.g., a main board). In an embodiment, the processor, memory, and/or interface may be disposed (e.g., mounted) on the first circuit board 248. The processor may include one or more of, e.g., a central processing unit, an application processor, a graphic processing device, an image signal processing, a sensor hub processor, or a communication processor. According to various embodiments, the first circuit board 248 may include a flexible printed circuit board type radio frequency cable (FRC). The first circuit board 248 may be disposed on at least a portion of the second cover member 221 and may be electrically connected to the antenna module and the communication module.

In an embodiment, the memory may include, e.g., a volatile or non-volatile memory.

In an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to various embodiments, the electronic device 101 may include a second circuit board 249 (e.g., a sub circuit board) spaced apart from the first circuit board 248 (e.g., a main circuit board) in the first housing 201. The second circuit board 249 may be electrically connected to the first circuit board 248 through a connection flexible board. The second circuit board 249 may be electrically connected with electric components disposed in an end area of the electronic device 101, such as the battery 289 or a speaker and/or a sim socket, and may transfer signals and power. In an embodiment, the second circuit board 249 may receive a wireless charging antenna (e.g., coil). In an embodiment, the battery 289 may receive power from an external electronic device through the wireless charging antenna, for example. In another embodiment, the battery 289 may transfer power to the external electronic device by the wireless charging antenna.

According to various embodiments, the battery 289 may be a device for supplying power to at least one component of the electronic device 101. The battery 189 may include a primary cell which is not rechargeable, a secondary cell which is rechargeable, or a fuel cell. The battery 289 may be integrally or detachably disposed inside the electronic device 101. In an embodiment, the battery 289 may include or consist of a single embedded battery or may include a plurality of removable batteries. In an embodiment, the battery 289 may be disposed in a frame 213, and the battery 289 may be slid along with the frame 213.

According to various embodiments, the guide rail 250 may guide the movement of the multi-bar structure 232. In an embodiment, the multi-bar structure 232 may slide along the slit 251 formed in the guide rail 250. In an embodiment, the guide rail 250 may be connected to the first housing 201. In an embodiment, the guide rail 250 may be connected to the first cover member 211 and/or the frame 213. In an embodiment, the slit 251 may be referred to as a groove or recess formed in the inner surface of the guide rail 250.

According to various embodiments, the guide rail 250 may provide pressure to the multi-bar structure 233 based on the driving of the motor 241.

In an embodiment, when the electronic device 101 changes from the closed state to opened state, the inner portion 252 of the guide rail 250 may provide pressure to the multi-bar structure 232. The multi-bar structure 232 receiving the pressure may be moved along the slit 251 of the guide rail 250, and the second housing 202 may be changed from the slide-in state to slide-out state with respect to the first housing 201. At least a portion of the display assembly 230 received between the first cover member 211 and the frame 213 may extend to the front surface.

In an embodiment, when the electronic device 101 changes from the opened state to closed state, an outer portion 253 of the guide rail 250 may provide pressure to the bent multi-bar structure 232. The multi-bar structure 232 receiving the pressure may be moved along the slit 251 of the guide rail 250, and the second housing 202 may be changed from the slide-out state to slide-in state with respect to the first housing 201. At least a portion of the display assembly 230 may be received between the first cover member 211 and the frame 213.

Referring to FIG. 20A, in the closed state of the electronic device 101, at least a portion of the second housing 202 may be received in the first housing 201. As the second housing 202 is disposed to be received in the first housing 201, the overall volume of the electronic device 101 may be reduced. In an embodiment, when the second housing 202 is received in the first housing 201, the size of the visually exposed display 231 may be minimized. In an embodiment, when the second housing 202 is completely received in the first housing 201, the first display area A1 of the display 231 may be visually exposed, and the second display area A2 may not be visually exposed. At least a portion of the second display area A2 may be disposed between the battery 289 and the rear plate 215 and 225.

Referring to FIG. 20B, in the opened state of the electronic device 101, at least a portion of the second housing 202 may protrude from the first housing 201. As the second housing 202 is disposed to protrude from the first housing 201, the overall volume of the electronic device 101 may be increased. In an embodiment, when the second housing 202 protrudes from the first housing 201, at least a portion of the second display area A2 of the display 231, together with the first display area A1, may be visually exposed to the outside of the electronic device 101.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present invention, the electronic device is not limited to the above-listed embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 101). For example, a processor (e.g., the processor 1620) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities. Some of the plurality of entities may be separately disposed in different components. According to an embodiment of the disclosure, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a housing including a first housing part and a second housing part configured to movably engage with the first housing part between a retracted position and an extended position;

a flexible display coupled to the first housing part and the second housing part so that a size of an area of the flexible display that is visible from a front side of the housing changes as the second housing part is moved between the retracted position and the extended position;

driving circuitry configured to move the second housing part with respect to the first housing part;

at least one processor; and memory which stores instructions, wherein the instructions, when executed by the at least one processor individually or collectively, cause the electronic device to:

identify an occurrence of an event related to the electronic device, determine a state of the electronic device based on the occurrence of the event, determine, based on the state of the electronic device, a length that the flexible display is to be slid-in or slid-out according to a progress of the occurred event, control the driving circuitry to gradually slid-in or slid-out the flexible display up to the determined length based on a ratio of a current progress value of the event to a maximum progress value of the event, and display information related to the progress of the occurred event on the flexible display slid-in or slid-out according to control of the driving circuitry.

2. The electronic device of claim 1, the instructions, when executed by the at least one processor individually or collectively, cause the electronic device to determine whether the occurred event is designated as a primary event after the event occurs.

3. The electronic device of claim 2, wherein the instructions, when executed by the at least one processor individually or collectively, cause the electronic device to control the driving circuitry so that the flexible display slides-in or slides-out based on the determined length when the event is designated as the primary event.

4. The electronic device of claim 1, wherein the event includes at least one of a charging event for charging a battery of the electronic device, an alarm generation event, a text message reception event, an event of executing a payment application, an emergency event, an event of a change in biometric information, or an event of a change in a context of performing a task.

5. The electronic device of claim 1, wherein the instructions, when executed by the at least one processor individually or collectively, cause the electronic device to determine that the electronic device is in an opened state or in a closed state, or determining a first length that the flexible display is slid-out from an inside of the first housing at a time point that the event is occurred.

6. A method for controlling an electronic device including a housing including a first housing part and a second housing part configured to movably engage with the first housing part between a retracted position and an extended position, a flexible display coupled to the first housing part and the second housing part such that a size of an area of the flexible display that is visible from a front side of the housing changes as the second housing part is moved between the retracted position and the extended position and a driving circuitry configured to move the second housing part with respect to the first housing part, the method comprising:

identifying an occurrence of an event related to the electronic device;

determining a state of the electronic device based on the occurrence of the event, determining, based on the state of the electronic device, a length that the flexible display is to be slid-in or slid-out according to a progress of the occurred event, controlling the driving circuitry to gradually slid-in or slid-out the flexible display up to the determined length based on a ratio of a current progress value of the event to a maximum progress value of the event, and displaying information related to the progress of the occurred event on the flexible display slid-in or slid-out according to control of the driving circuitry.

7. The method of claim 6, further comprising determining whether the event is designated as a primary event after the event occurs.

8. The method of claim 6, further comprising controlling the driving circuitry when the event is designated as the primary event.

9. The method of claim 6, wherein the event includes at least one of a charging event for charging a battery of the electronic device, an alarm generation event, a text message reception event, an event of executing a payment application, an emergency event, an event of a change in biometric information, or an event of a change in a context of performing a task.

10. The method of claim 9, wherein the event includes the charging event, and the method further comprises controlling the driving circuitry to extend the flexible display according to a charging state of the battery when the event is the charging event.

11. The method of claim 9, further comprising controlling the driving circuitry to extend the flexible display to a maximum in the second direction when a designated time arrives to generate an alarm or a text message is received when the event is the alarm generation event or the text message reception event.

12. The method of claim 9, further comprising controlling the driving circuitry to move the flexible display in the first direction in a maximally extended state of the flexible display over time when the event is the event of executing the payment application.

13. The method of claim 9, further comprising controlling the driving circuitry to move the flexible display in the second direction according to an elapse of a time related to the emergency event or the change in the biometric information when the event is the emergency event or the event of the change in the biometric information.

14. The method of claim 9, further comprising controlling the driving circuitry to move the flexible display in the second direction as the task is completed when the event is the event of the change in the context of performing the task.

15. The method of claim 6, further comprising controlling the driving circuitry so that the flexible display fully slides-in from the identified length or fully slides-out from the identified length while the occurred event is progressed.

16. A non-transitory computer-readable medium having recorded thereon a program for implementing a method for controlling an electronic device including a housing including a first housing part and a second housing part configured to movably engage with the first housing part between a retracted position and an extended position, a flexible display coupled to the first housing part and the second housing part such that a size of an area of the flexible display that is visible from a front side of the housing changes as the second housing part is moved between the retracted position and the extended position and a driving circuitry configured to move the second housing part with respect to the first housing part, the method comprising:

identifying an occurrence of an event related to the electronic device;

determining a state of the electronic device based on the occurrence of the event, determining, based on the state of the electronic device, a length that the flexible display is to be slid-in or slid-out according to a progress of the occurred event, controlling the driving circuitry to gradually slid-in or slid-out the flexible display up to the determined length based on a ratio of a current progress value of the event to a maximum progress value of the event, and displaying information related to the progress of the occurred event on the flexible display slid-in or slid-out according to control of the driving circuitry.

17. The non-transitory computer-readable medium of claim 16, wherein the method further comprises determining whether the event is designated as a primary event after the event occurs.

18. The non-transitory computer-readable medium of claim 16, wherein the method further comprises controlling the driving circuitry when the event is designated as the primary event.

19. The non-transitory computer-readable medium of claim 16, wherein the event includes at least one of a charging event for charging a battery of the electronic device, an alarm generation event, a text message reception event, an event of executing a payment application, an emergency event, an event of a change in biometric information, or an event of a change in a context of performing a task.

20. The non-transitory computer-readable medium of claim 19, wherein the event includes the charging event, and the method further comprises controlling the driving circuitry to extend the flexible display according to a charging state of the battery when the event is the charging event.

* * * * *